(12) United States Patent
Teets et al.

(10) Patent No.: US 6,314,717 B1
(45) Date of Patent: Nov. 13, 2001

(54) ELECTRICITY GENERATING SYSTEM HAVING AN ANNULAR COMBUSTOR

(75) Inventors: J. Michael Teets, Hobe Sound, FL (US); Jon W. Teets, Scottsdale, AZ (US)

(73) Assignee: Elliott Energy Systems, Inc., Stuart, FL (US)

( * ) Notice: Subject to any disclaimer, the term of this patent is extended or adjusted under 35 U.S.C. 154(b) by 0 days.

(21) Appl. No.: 09/319,478

(22) PCT Filed: Dec. 3, 1997

(86) PCT No.: PCT/US97/22007

§ 371 Date: Aug. 18, 1999

§ 102(e) Date: Aug. 18, 1999

(87) PCT Pub. No.: WO98/25082

PCT Pub. Date: Jun. 11, 1998

Related U.S. Application Data
(60) Provisional application No. 60/032,090, filed on Dec. 3, 1996.

(51) Int. Cl.[7] ........................................ F02C 3/06
(52) U.S. Cl. .................... 60/39.36; 60/39.08; 60/39.281; 60/39.511; 60/734
(58) Field of Search ................... 60/39.511, 39.08, 60/39.36, 734, 39.281

(56) References Cited

U.S. PATENT DOCUMENTS

| | | |
|---|---|---|
| Re. 34,962 | 6/1995 | Shekleton et al. ............ 60/39.36 |
| 3,187,188 | 6/1965 | Adkins et al. . |
| 3,247,393 | 4/1966 | Toesca . |
| 3,613,360 | 10/1971 | Howes ................ 60/39.36 |
| 4,486,147 | 12/1984 | Byrne et al. . |
| 4,619,588 * | 10/1986 | Moore, III ................ 417/366 |
| 5,129,222 | 7/1992 | Lampe et al. . |
| 5,140,807 | 8/1992 | Shekleton et al. ............ 60/39.36 |
| 5,180,034 * | 1/1993 | Lopes ................ 60/39.08 |
| 5,237,817 | 8/1993 | Bornemisza et al. ............ 60/226.1 |
| 5,497,615 | 3/1996 | Noe et al. ................ 60/39.511 |
| 5,685,156 * | 11/1997 | Willis et al. ................ 60/39.511 |

FOREIGN PATENT DOCUMENTS

| | | |
|---|---|---|
| 0742634 | 11/1996 | (EP) . |
| 06173714 | 6/1994 | (JP) . |

* cited by examiner

*Primary Examiner*—Charles G. Freay
*Assistant Examiner*—E. D. Hayes

(57) ABSTRACT

An electricity generating system having a body (159), an annular combustor (14), a turbine (16), a compressor chamber and a compressor (102) positioned within the compressor chamber. An inlet port is in fluid communication with the compressor chamber and an exit port is in fluid communication with the turbine. A plurality of magnets (MG) is secured to the rotor (18) and a stator (22) made of mangnetically attracted material, such as iron, and having a stator winding provided in the body (159). The stator winding is positioned in close proximity to the plurality of magnets mounted to the rotor whereby rotation of the rotor (18) induces a current in the winding.

18 Claims, 15 Drawing Sheets

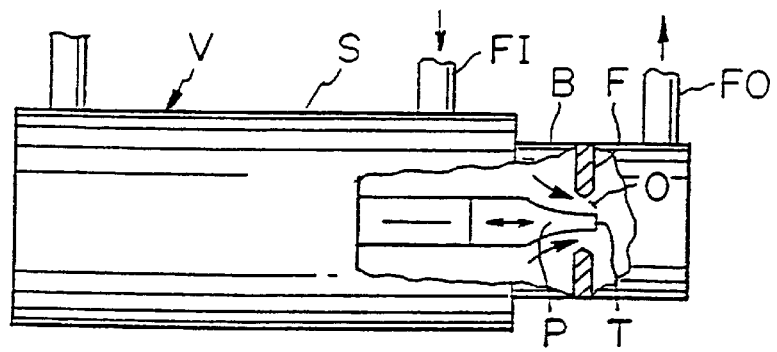
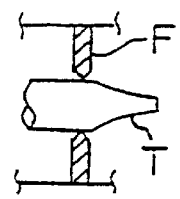
FIG. 8A  FIG. 8B
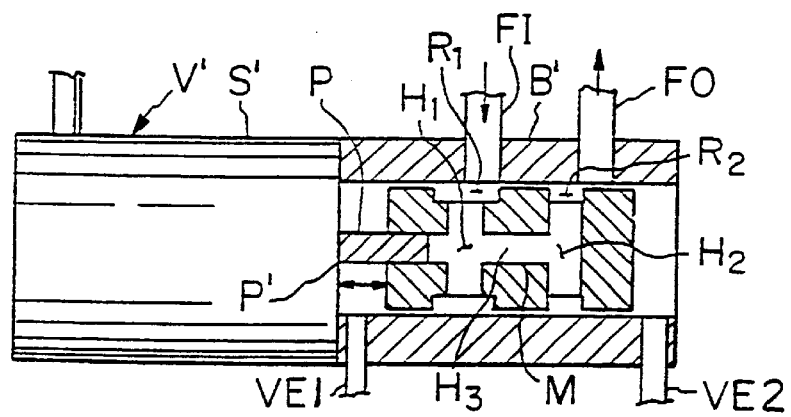
FIG. 9
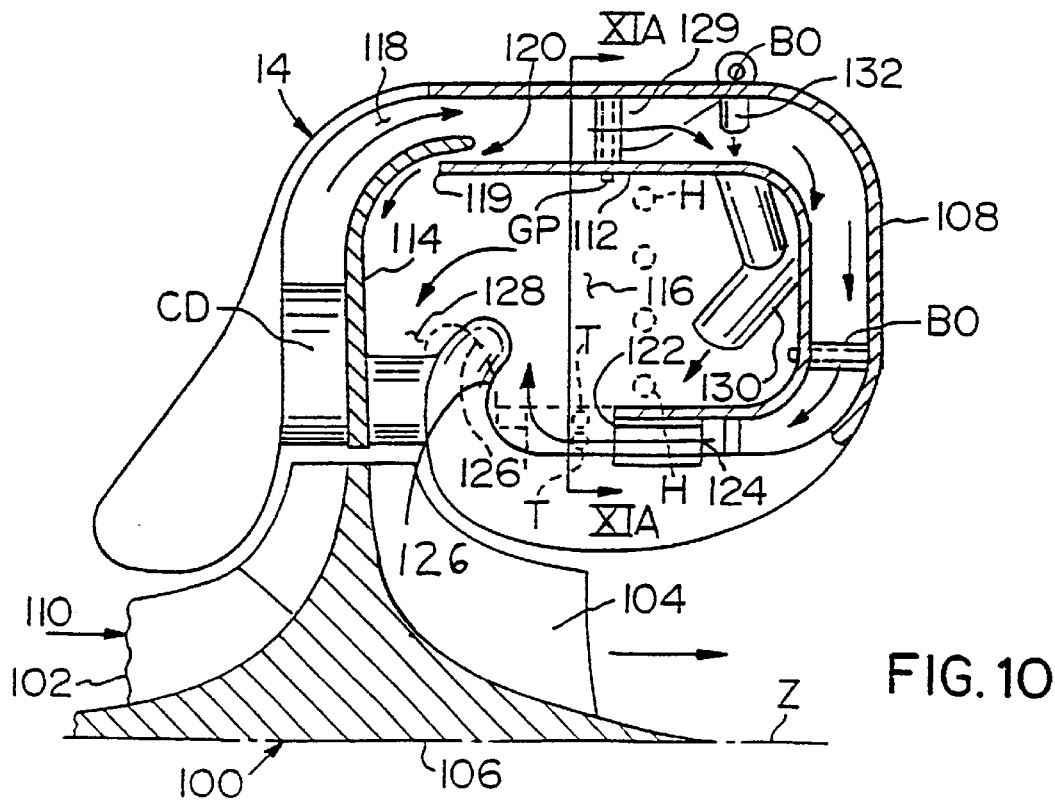
FIG. 10

ELECTRICITY GENERATING SYSTEM
HAVING AN ANNULAR COMBUSTOR

This applications claims benefit of provisional application of Ser. No. 60/032,090 filed Dec. 30,1996.

BACKGROUND OF THE INVENTION

1) Field of the Invention

This invention relates generally to a system for generating electricity, and more particularly, to a compact system which includes an annular combustor and a turbine for generating electricity.

2) Description of the Prior Art

Compact electricity generating systems using annular combustors and turbines are known. Currently, these systems are used to generate between 25 to 50 kilowatts of electric power. Such systems are manufactured by some companies such as Capstone Turbine Corporation, Marbaix, Bowman Power Systems, Ltd. and Allied-Signal Corp.

The majority of the above-described electricity generating systems is designed for use by the military in combat conditions, although they can be used in other applications. Hence, these generating systems are built pursuant to military specifications, which results in expensive systems.

While the military demand for compact electricity generating systems has diminished, there has been a recent interest in these systems for non-military applications, primarily as a backup power source for computers. However, the acceptance of these systems has been limited due to their high cost.

Therefore, it is an object of the present invention to provide an inexpensive, compact, lightweight and durable electricity generating system that includes an annular combustor using hydrocarbon fuels, such as diesel, jet, gasoline, natural gas and alcohol type fuels.

Typically, the exhaust gases (of other gas turbines) exiting the combustor are treated to control the $NO_x$ emissions exiting into the atmosphere.

Therefore, it is another object of the present invention to provide a low $NO_x$ and general overall low emissions combustor.

Furthermore, in many applications, electricity generating systems of this type are operated intermittently and such use of the systems can cause clogged fuel lines, injectors and/or fuel pumps. It is important that these systems operate on demand because they are primarily used as backup systems for a primary power source and/or as main power.

Therefore, it is a further object of the present invention to provide a reliable electricity generating system that can operate intermittently with consistent reliability.

SUMMARY OF THE INVENTION

An electricity generating system having a body, an annular combustor, a turbine, a compressor chamber and a compressor positioned within the compressor chamber. An inlet port is in fluid communication with the compressor chamber and an exit port is in fluid communication with the turbine with a combustor therebetween. A plurality of magnets are secured to the rotor and a stator made of a magnetically attracted material, such as iron, is provided in the body. The stator is positioned in close proximity to a plurality of magnets whereby rotation of the rotor causes a change in flux about the stator thereby generating electricity. A fuel pump and oil pump are provided which are both driven by a single motor. A fuel metering valve is provided and includes a proportional solenoid valve having a plunger that is adapted to extend along a longitudinal axis. An annular-shaped or hydrodynamic bearing is provided for rotatably receiving a portion of the rotor and is held in place by a locking arrangement Compressor blades and turbine blades are separated by a split ring arrangement for preventing gases from flowing directly to the turbine blades from the compressor blades and vice versa. A heat exchanger is provided to heat the incoming compressed gas and cool the outgoing exhaust gases or, in other words, compressor discharge air before delivery to the combustor for minimizing fuel consumption.

The present invention is also a method for operating an electricity generating system that includes the steps of: rotating a rotor having a plurality of compressor blades and a plurality of turbine blades attached thereto and a plurality of magnets positioned about the rotor, the plurality of magnets positioned in close proximity to a stator to cause rotation of the rotor; drawing air into a compressor that includes the plurality of compressor blades; compressing the drawn air by the compressor; following the compressed air to a combustion chamber; mixing fuel with at least a portion of the compressed air flowing into the combustion chamber resulting in a fuel/air mixture; igniting the fuel/air mixture in the combustion chamber resulting in exhaust gases or heat energy; passing the exhaust gases or heat energy and any remainder of the compressed air through a turbine that includes the plurality of turbine blades; exhausting the exhaust gases or heat energy and the remainder of the compressed gases; stopping the electricity provided to the stator when the rotor rotates at a first speed; and causing electricity to be generated by the rotating magnets positioned about the rotor coacting with the stator. Igniting the fuel/air mixture in the combustion chamber yields heat energy to drive a turbine wheel of the turbine. The developed flame in the combustor as it passes to a turbine nozzle and the turbine wheel receives dilution air to regulate a turbine inlet temperature.

BRIEF DESCRIPTION OF THE DRAWINGS

FIG. 8A is a partial section of a metering valve in accordance with the present invention;

FIG. 8B is a partial section of the metering valve shown in FIG. 8A;

FIG. 9 is a partial section of another embodiment of a metering valve in accordance with the present invention;

FIG. 10 is a section of a portion of the combustor in the generating system shown in FIG. 1A;

DESCRIPTION OF THE PREFERRED EMBODIMENTS

Figure 1A:
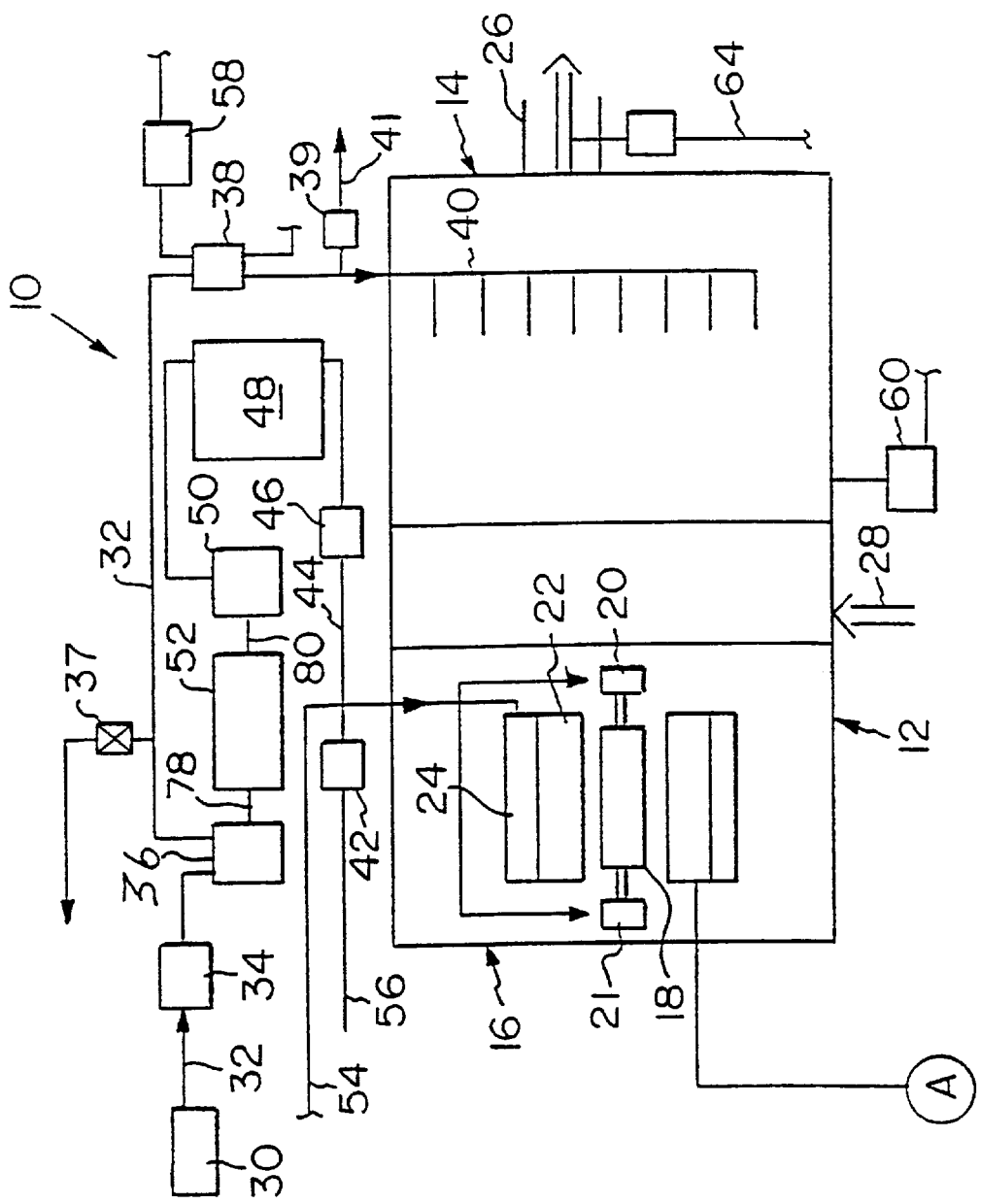
FIGS. 1A and 1B are schematic diagrams of a generating system in accordance with the present invention.

For purposes of description herein, the terms "upper", "lower", "right", "left", "rear", "front", "vertical", "horizontal" and derivatives thereof shall relate to the invention as oriented in the drawing figures. However, it is to be understood that the invention may assume various alternative orientation and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1B:
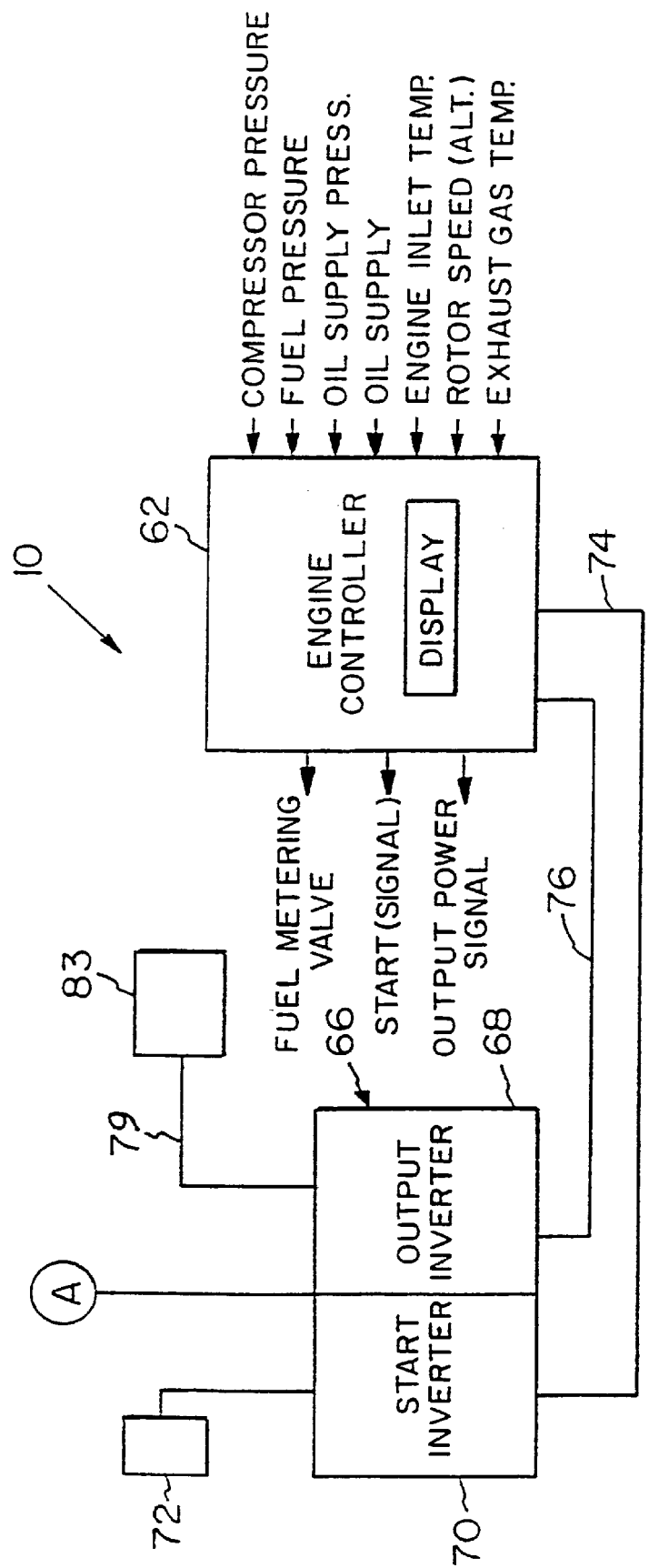
Figure 18:
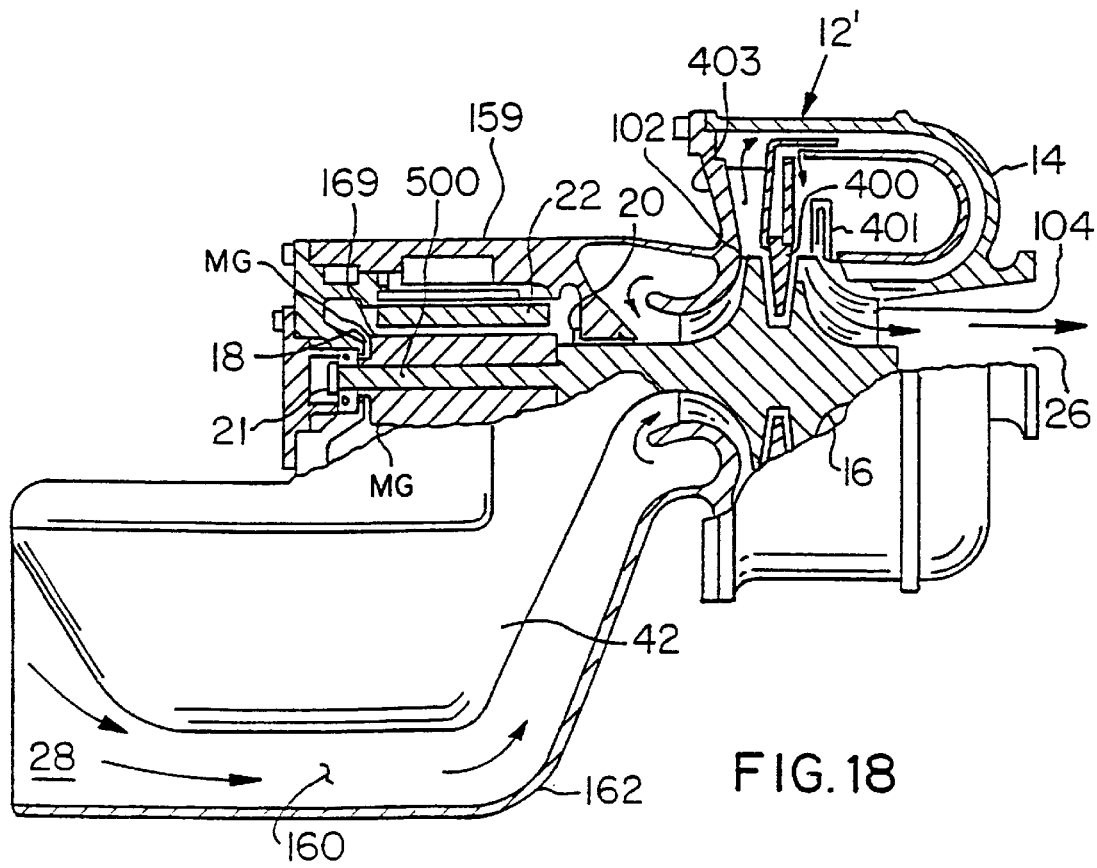
FIG. 18 is a side elevation, partially in section, of the power plant schematically shown in FIG. 1A.
Figure 19:
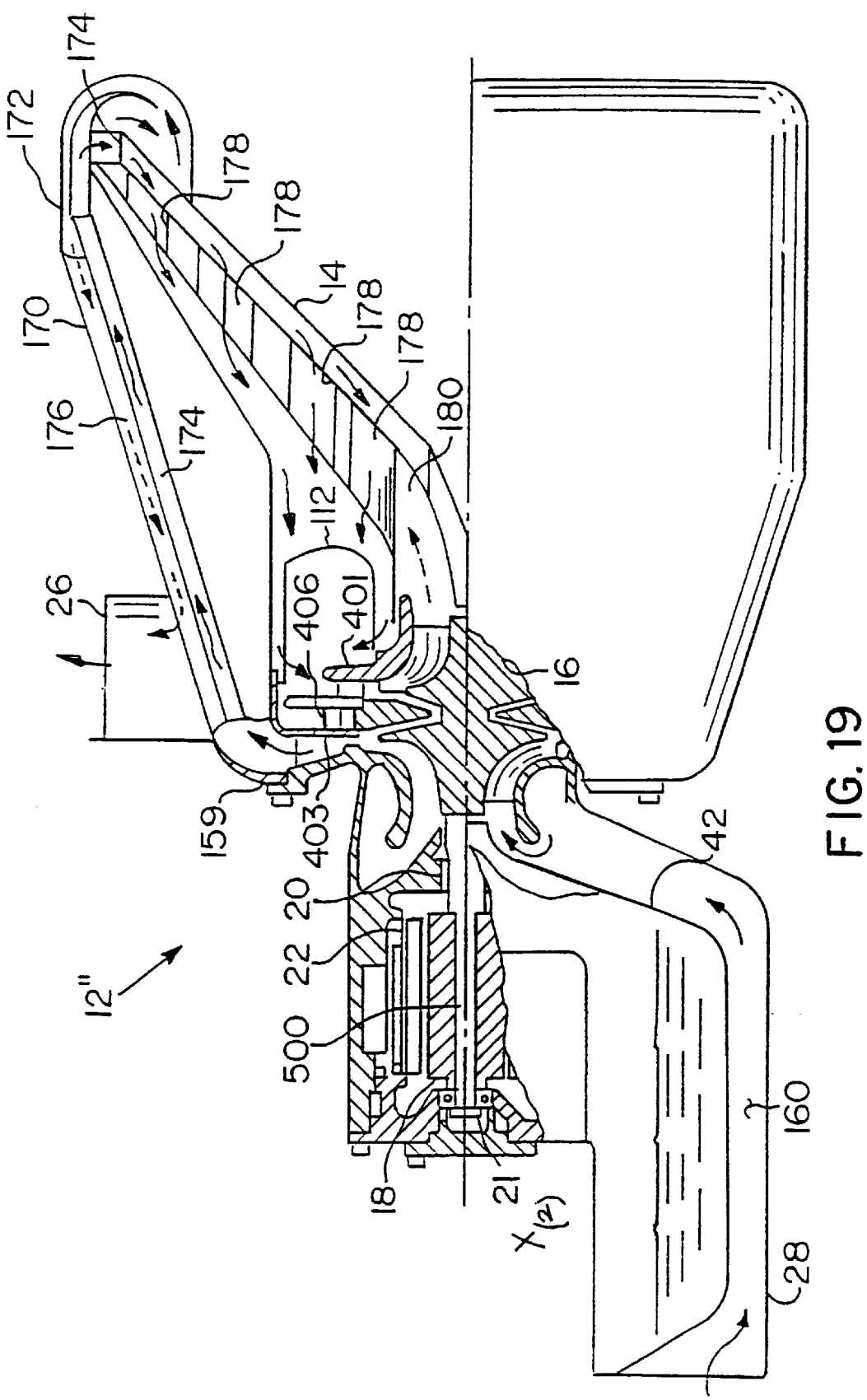
FIG. 19 is a side elevation, partially in section, of another embodiment of a power plant shown in FIG. 1A incorporating a heat exchanger.

FIGS. 1A and 1B of the drawings show a schematic diagram of an electricity generating system 10 in accordance with the present invention. The system 10 includes a power plant 12 having an annular combustor 14 with a combustion chamber through which gas products of combustion pass prior to exiting through an exit port 26. Two specific power plant embodiments are shown in FIGS. 18 and 19 of the drawings. The embodiment shown in FIG. 19 of the drawings incorporates a heat exchanger to recoup some exhaust gas heat and improves the overall thermal efficiency of the system. The embodiment shown in FIG. 18 of the drawings does not include a heat exchanger. Referring back to FIG. 1A of the drawings, the annular combustor 14 is fluidly coupled to a turbine rotor 16 which includes a rotor 18 rotatably supported on the opposed ends by bearings 20 and 21 so that the rotor 18 can rotate about a longitudinal axis. An electrical stator 22 is positioned coaxially with the rotor 18 and a heat exchanger 24 is fluidly coupled to the turbine rotor 16. An air inlet port 28 is provided.

Figure 2:
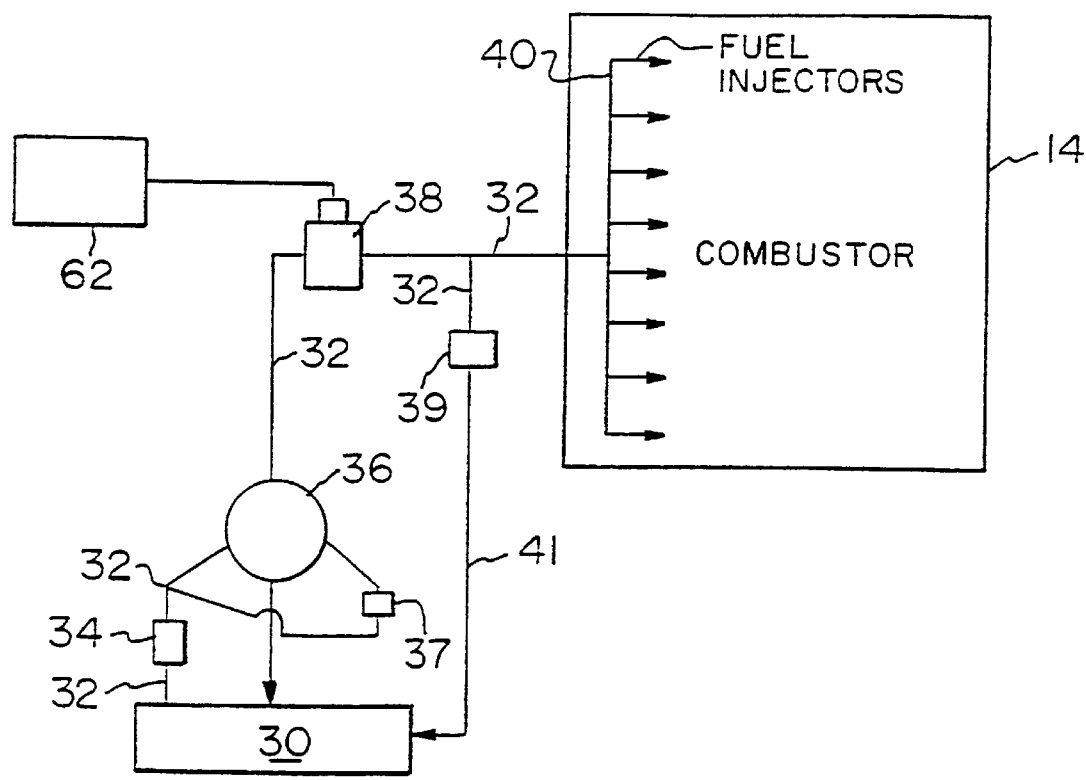
FIG. 2 is a schematic diagram of a liquid fuel supply system for the generating system shown in FIG. 1A.

Liquid fuel, such as heating oil, is contained in a fuel tank 30 which is connected to and is in fluid communication with the annular combustor 14 by a conduit 32. The conduit 32 is connected to a fuel filter 34, a fuel pump 36, a pressure relief valve 37 and a fuel metering valve 38 which are fluidly coupled to or in fluid communication with the annular combustor 14. The conduit 32 supplies a plurality of fuel injectors 40 provided in the annular combustor 14. FIG. 2 of the drawings depicts a fuel purge valve 39 and is connected to the conduit 32 between the fuel injectors 40 and the fuel metering valve 38. A conduit 41 connects the fuel purge valve 39 to the fuel tank 30 to discharge fuel to the fuel reservoir during normal engine shutdown allowing fuel in the injectors and fuel manifold to be purged out and hence, preventing fuel coking/clogging tendencies.

Figure 3:
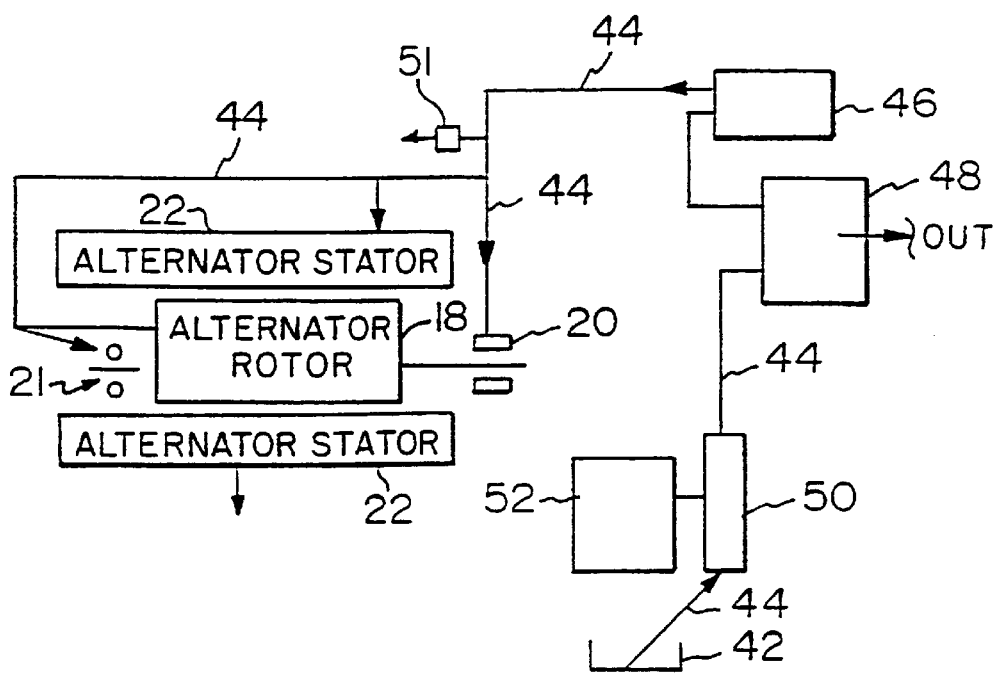
FIG. 3 is a schematic diagram of an alternate oil system for the generating system shown in FIG. 1A.

Referring to FIGS. 1A and 3 of the drawings, lubricating oil is supplied for lubrication to the bearings 20 and 21 from a sump 42 which is fluidly connected to the bearings 20 and 21 by a conduit 44. (FIG. 3 of the drawings shows an alternate arrangement from FIG. 1A of the drawings and shows some external engine components coacting with the lubricating oil system, which are not shown in FIG. 1A of the drawings. The arrangement shown in FIG. 3 of the drawings can be incorporated with the generating system shown in FIGS. 1A and 1B of the drawings.) The conduit 44 is connected to an oil filter 46, an air/oil heat exchanger 48 and a lubricating oil pump 50. Lubricating oil flowing through the bearings 20 and 21 returns to the sump 42, along with oil out of the alternator stator heat exchanger 24. An oil pressure relief valve 51 is fluidly coupled to or in fluid communication with the conduit 44 and is in fluid communication with the sump 42. It is to be understood that the phrase "fluidly coupled to" as used herein can be interchanged with the phrase "in fluid communication with".

Referring again to FIGS. 1A and 1B of the drawings, both fuel pump 36 and lubricating oil pump 50 are positive displacement pumps which are mechanically driven by a 24 volt electric motor 52. Transducers 54, 56, 58 and 60 are provided for measuring lubricating oil temperature, lubricating oil pressure, fuel pressure and the compressor exit gas pressure, respectively. Transducers 54, 56, 58 and 60 are electrically coupled to a microprocessor controlled engine controller 62. A thermocouple 64 is positioned in the exit port 26 downstream of the turbine for measuring the temperature of the turbine exhaust gases. Thermocouple 64 is electrically coupled to the engine controller 62.

The engine controller 62 is electrically connected to an inverter arrangement 66 that includes an output inverter 68 and a start inverter 70. This arrangement is disclosed in the PCT application entitled "Electrical System for Turbine/

Alternator on Common Shaft" having inventors Suresh E. Gupta, Douglas R. Burnham, Jon W. Teets, J. Michael Teets and Brij Bhargava, filed concurrently herewith and incorporated herein by reference. The start inverter 70 is electrically connected to a 24 volt DC battery 72 as well as to the engine controller 62 by an input line 74. An output line 76 electrically connects the engine controller 62 to the output inverter 68. The output inverter 68 is adapted to provide electricity by a line 79 to a customer electric supply 83 or to power an electrical component, such as a computer.

Figure 4:
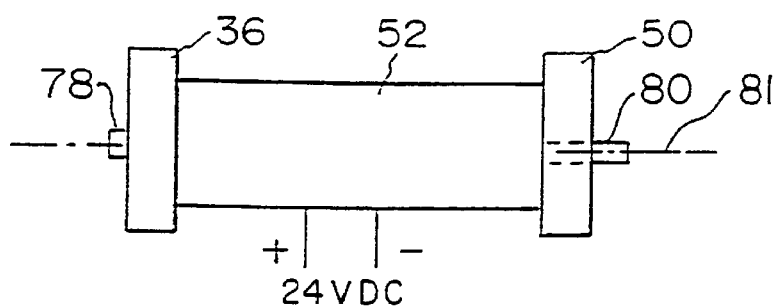
FIG. 4 is a plan view of a motor, fuel pump and oil pump arrangement used in the generating system shown in FIG. 3A.

FIG. 4 of the drawings shows the electric motor 52 mechanically coupled to the fuel pump 36 and to the lubricating oil pump 50. Preferably, electric motor 52 is a brushless electric motor. The pumps 36 and 50 are operatively connected or coupled to the electric motor 52 by rotatable drive shafts or electric motor shafts 78 and 80, respectively. Energizing the electric motor 52 causes the drive shafts 78 and 80 to rotate about their longitudinal axes 81.

Figure 6:
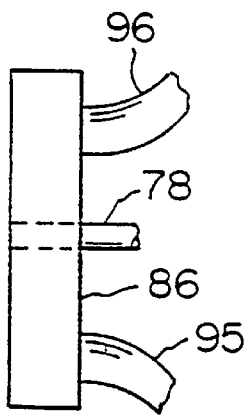
FIG. 6 is a side elevation of the fuel pump shown in FIG. 5.
Figure 5:
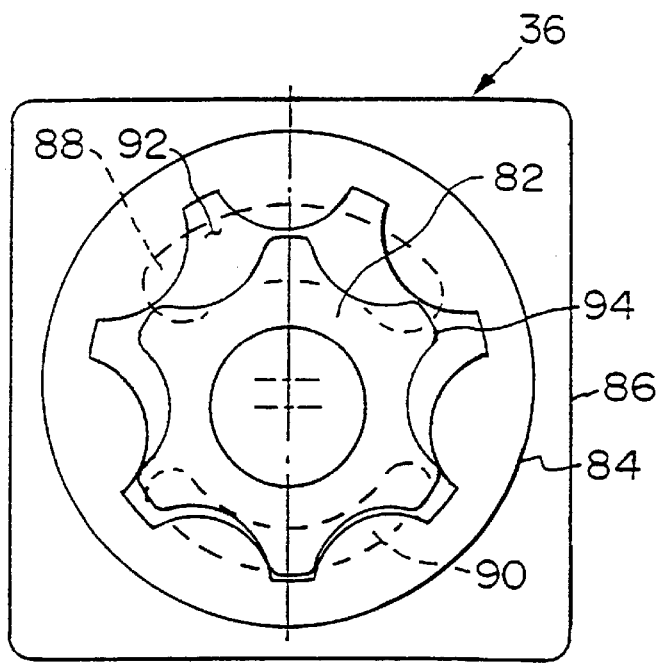
FIG. 5 is an end view of a portion of the fuel pump shown in FIG. 4.
Figure 7:
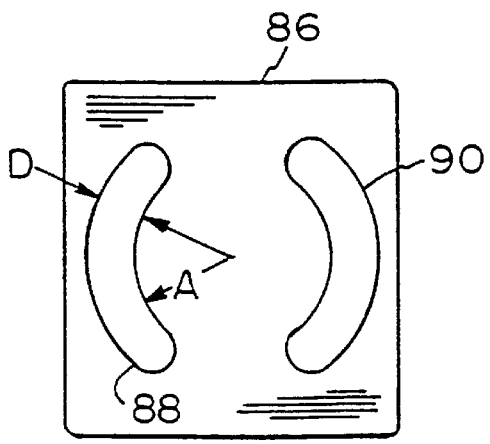
FIG. 7 is a top plan view of a portion of the fuel pump shown in FIGS. 5 and 6.

The pumps 36 and 50 are positive displacement pumps and preferably are gerotor type pumps. Referring to FIGS. 5–7 of the drawings, each fuel pump 36 includes an inner rotor 82 positioned within an outer rotor 84 which is positioned within a casing 86. An arcuate inlet port 88 and an arcuate outlet port 90 are formed in the casing 86. Electric motor shaft 78 is mechanically coupled to the inner rotor 82 so that rotation of the shaft about the longitudinal axis 81 causes the inner rotor 82 to rotate relative to the outer rotor 84. The outer rotor 84 defines a plurality (N) of pumping chambers 92 and a plurality (N−1) of radially extending gear teeth 94 which are formed on the inner rotor 82 and are received in the pumping chambers 92 in a manner well known in the art. Specifically, as the inner rotor 82 rotates or moves about the outer rotor 84 and casing 86, liquid (lubricating oil) is pumped through the casing 86 from an inlet tube 95 to inlet port 88 through the pumping chambers 92, the outlet port 90 and an outlet tube 96. The lubricating oil pump So operates in the same manner as fuel pump 36, with the exception that it is driven by the electric motor shaft 80 and is not discussed in further detail. The fuel pump is unnecessary if a pressurized gaseous fuel, such as methane, is used. The flow of methane can be controlled via an electromechanical valve.

An advantage of the present oil pump/fuel pump motor arrangement is that if the lubricating oil pump 50 fails (which typically means that the inner rotor 82 becomes jammed and cannot rotate about the longitudinal axis 81), the electric motor 52 will stall, thereby preventing the drive shafts 78 and 80 from rotating. Also, if the electric motor or fuel pump fails, there will be a safe shutdown. This causes the system to "shut down" because no fuel will be supplied to the annular combustor 14 by the fuel pump 36 which is driven by the electric motor shafts 78 and 80. Hence, damage to the system components is prevented due to an inadequate supply of lubricating oil to the rotating system parts. The lubricating oil pump 50 and/or electric motor 52 must be repaired before fuel can be supplied to the annular combustor 14.

Referring to FIGS. 3A, 8A, 8B and 9 of the drawings, fuel is pumped by the fuel pump 36 and flow is varied to the engine by the fuel metering valve 38. Preferably, the fuel metering valve 38 is a spring-loaded closed, proportional solenoid valve. The position of the solenoid valve varies as a function of the current passing through the solenoid which varies the rate of fuel flow through the fuel metering valve 38.

FIGS. 8A (open position) and 8B (closed position) of the drawings show one embodiment of the fuel metering valve 38, wherein the valve is designated V. The valve V includes a proportional solenoid S and a valve body B that defines a plunger cavity. A longitudinally movable cylindrical plunger P that extends along a longitudinal axis includes a variable diameter tip T which varies with respect to the longitudinal axis. An orifice plate or flow plate F having a centrally positioned orifice or hole O is provided in the valve body B. (Alternatively, only the cylindrical plunger P could be used to coact with the orifice O.) The orifice plate F divides the valve body B into an inlet chamber and an outlet chamber. A fuel inlet line FI is connected to a fuel inlet provided in the inlet chamber and a fuel outlet line FO is connected to a fuel outlet provided in the outlet chamber. Activation of the solenoid S causes cylindrical plunger P and tip T to move in the longitudinal direction. The tip T coacts with the orifice O in the orifice plate F to vary the size of the orifice O permitting fuel to flow therethrough, shown in FIG. 8A of the drawings. This, in turn, varies the flow from the inlet to the outlet through the orifice O in the orifice plate F. FIG. 8B of the drawings shows the tip T closing the orifice O to prevent the flow of fuel between the inlet chamber and the outlet chamber. Hence, the position of the tip T relative to the orifice plate F controls the flow of fuel to the annular combustor 14. As can be seen in FIGS. 8A and 8B, the tip T varies between a diameter less than a diameter of the orifice O to a diameter greater than the orifice O whereby the cylindrical plunger P is adapted to move both in a first longitudinal direction and a second longitudinal direction. The cylindrical plunger P extends through the orifice O and contacts the orifice plate F blocking flow across the orifice plate F in a blocked position when the cylindrical plunger P moves a first distance in the first longitudinal direction. When the cylindrical plunger P is moved in the second direction from the blocked position, the tip T is positioned away from the orifice plate F and flow through the orifice plate F varies as a function of a longitudinal position of the tip T.

FIG. 9 of the drawings shows another embodiment of the fuel metering valve 38, wherein the valve is designated V'. The valve V' includes a proportional solenoid S' and a valve body B' which defines a plunger cavity. A longitudinally movable cylindrical plunger P' that is adapted to extend along a longitudinal axis is provided and extends in the plunger cavity of the valve body B'. The cylindrical plunger P' is made up of the cylindrical plunger P rigidly secured to a manifold or tip M. Fuel enters from fuel inlet line FI through an inlet defined the valve body B' to a cylindrical chamber on cylindrical plunger P' that is a continuous ring $R_1$ around the cylindrical plunger P'. Flow of fuel goes from ring $R_1$ through a connecting shaft hole $H_1$ defining an inlet port connected to a shaft hole $H_2$ defining an outlet port via a hole passageway $H_3$ to an outlet defined by the valve body B' and then out fuel outlet line FO via an annular ring $R_2$. Holes $H_1$, $H_2$ and $H_3$ define a flow passageway in fluid communication with the inlet port to the outlet port.

The closed position is when the cylindrical plunger P' is fully positioned to the left, shown in FIG. 9 of the drawings. This closes off ring $R_2$ from the fuel outlet line FO. Metering of fuel occurs by positioning of ring $R_2$ to fuel outlet line FO. Vent lines VE1 and VE2 are also connected to the cavity at the end of the plunger travel areas.

In the operation of the metering valve, shown in FIG. 9 of the drawings, the proportional solenoid S' is activated to move the cylindrical plunger P' in a first longitudinal direction within the cavity of the valve body B'. The cylindrical plunger P' (positioning ring $R_2$) is then positioned to either block fuel flow from the fuel inlet line FI to the fuel outlet line FO or permit fuel to flow therethrough. The fuel flow rate depends on the longitudinal position of ring $R_2$ relative to the fuel outlet line FO, provided the fuel pump pressure remains constant. Fuel pump pressure to the metering valve is maintained via a pressure relieve valve. The rings $R_1$ and $R_2$ are defined on the manifold M mounted to the cylindrical plunger P. The outer portions of the manifold M defining rings $R_1$ and $R_2$ act as a blocking member to block or vary the flow passing through one or both of the fuel inlet line FI and the fuel outlet line FO. Hence, moving the manifold M in the longitudinal direction causes the inlet port, the outlet port and the blocking member to coact with the inlet and the outlet to vary a flow through the valve body B' from the inlet to the outlet.

Referring again to FIGS. 1A and 2 of the drawings, the fuel purge valve 39 positioned within conduit 41 is a normally closed solenoid valve, such as a 24 volt DC two-way N.C. solenoid valve. In operation, the fuel purge valve 39 is only in the open position for a fixed period of time when the fuel to the engine (via metering valve) is shut off. Electric motor 52 is still on until the rotor speed reaches zero RPM (revolutions per minute) at which time the electric motor 52 gets turned off. This allows any residual fuel in the fuel injectors 40 or its related manifold to be blown out by the combustor pressure into the fuel tank 30. This purging operation minimizes/prevents fuel from coking, clogging or plugging the fuel injectors 40, which can cause problems in fuel distribution.

FIG. 10 of the drawings shows a partial cross section of a portion of the annular combustor 14. The annular combustor 14 is connected to a compressor/turbine arrangement 100. The compressor/turbine arrangement 100 includes compressor blades 102 and turbine blades 104 positioned around an engine rotor or rotary drive shaft 106. Cantilevered from an outboard bearing, the engine rotor 106 is adapted to rotate about a longitudinal Z axis and is supported by bearings 20 and 21 which are schematically shown in FIG. 1A of the drawings.

An annular outer housing wall 108 is provided and defines an air intake passage 110 positioned adjacent compressor blades 102. An outer combustor liner wall 112 and a forward housing wall or inner housing wall 114 define an annular combustion chamber 116. The forward housing wall 114 and a forward portion of the outer housing wall 108 define a compressor/diffuser air path or passageway 118 which begins adjacent to a diffuser exit which is in fluid communication with the annular combustion chamber 116. A compressor diffuser CD is provided in the passageway 118. The annular combustion chamber 116, the turbine and the air path 118 are in fluid communication with each other. An annular cooling area 119 is defined by a distal end 120 of the forward housing wall 114 and a forward end of the outer combustor liner wall 112. The annular cooling area 119 directs cooling air toward an annular turbine nozzle 128. annular air dilution duct or air dilution nozzle 122 is defined at a terminal end of the outer combustor liner wall 112. A corrugated wiggle strip 124 may be provided in the air dilution duct 122. Alternatively, the wiggle strip 124 can be eliminated and replaced by either holes H, shown in phantom, formed in the outer combustor liner wall 112, or by having the outer combustor liner wall 112 abut a turbine nozzle wall 126', shown in phantom, and by having a plurality of holes H and T, shown in phantom, formed in the outer combustor liner wall 112 for dilution of the flame contained within the annular combustion chamber 116. It is preferable that a ring (not shown) be provided to adjust the cross-sectional area of the holes T to control the amount of air entering into the secondary air supply and thus maintain a constant flame temperature and $No_x$ emissions.

The outer combustor liner wall 112 is secured to the outer housing held by a plurality of bolts BO, such as two. One of the bolts BO defines a hole adapted to receive an igniter GP adapted to start a fuel system for liquid fuels. The igniter GP passes through the respective bolt BO and into the annular combustion chamber 116. An upwardly extending curved turbine nozzle wall 126 is spaced from air dilution nozzle 122. Alternatively, the turbine nozzle wall 126 can be straight as shown in phantom and designated as 126'. The turbine nozzle wall 126 and the forward housing wall 114 define the annular turbine nozzle 128 which is in fluid communication with the turbine blades 104 which form the turbines. An air flow path or passageway 129 is defined between the outer housing wall 108 and the outer combustor liner wall 112.

A plurality of premix chambers or secondary premix chambers 130 are circumferentially spaced about and secured to the outer combustor liner wall 112 adjacent to a rearward wall of the annular combustion chamber 116. A plurality of circumferentially dispensed radially or tangentially positioned fuel injectors or nozzles 132 extends through the outer housing wall 108 and into the air flow path 129 such as to position fuel delivery to a primary premix chamber, inlet zone or first end 138 of FIG. 11A of the drawings.

Figure 11A:
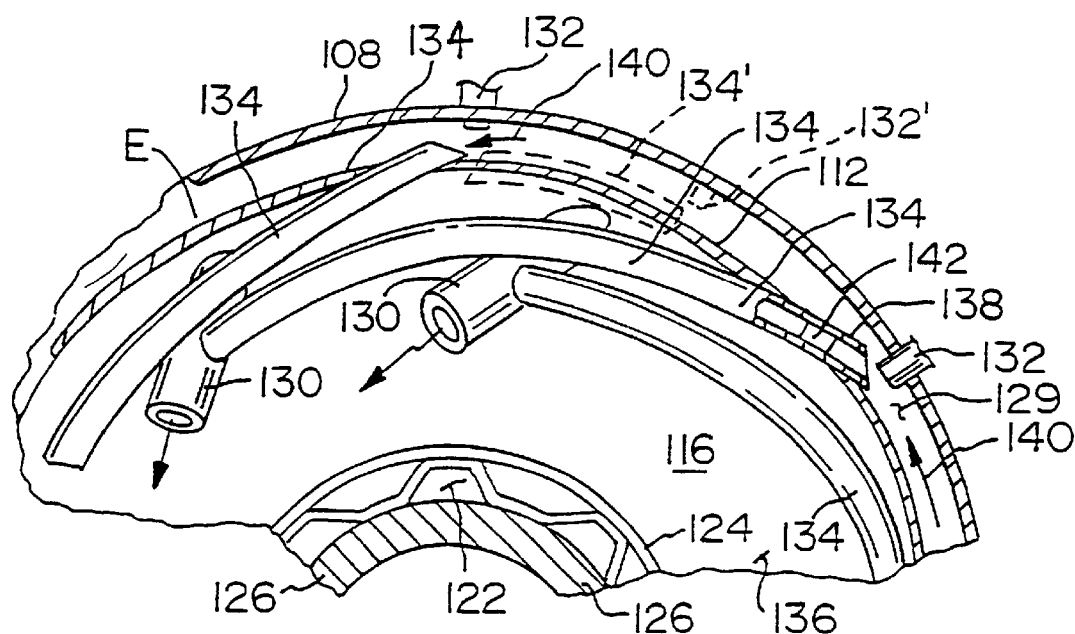
FIG. 11A is a partial section taken along lines XIA—XIA of FIG. 10.
Figure 11B:
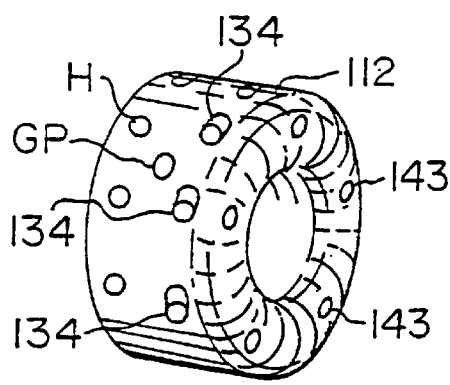
FIG. 11B is a top perspective view of an outer combustor liner wall shown in FIG. 10.

Referring to FIGS. 11A and 11B of the drawings, the fuel injectors 132 pass through the outer housing wall 108 and terminate within the air flow path 129. A plurality of primary premix conduits 134 extend circumferentially about the outer combustor liner wall 112 adjacent to a back wall 136 of the annular combustion chamber 116. Inlet zones 138 of the primary premix conduits 134 are positioned in close proximity to and in fluid communication with the terminating ends of the fuel injector 132 and are angled so that they face in the flow direction of arrows 140. A swirler 142 is provided in each of the primary premix conduits 134 to assist in fuel vaporization and quick dispersement of liquid fuel to primary premix conduits 134. Alternatively, swirlers 142 can be eliminated. Primary premix conduits 134 are arranged with respect to the outlet ends of the fuel injectors 132 to direct a rich (non-combustible mixture) fuel/air mixture from an exit or second end in a predominantly circumferential direction within the premix chamber 130 where further air is added for a combustible mixing toward the forward housing wall 114 of the annular combustion chamber 116. The igniter GP is provided in the outer combustor liner wall 112 and extends into the annular combustion chamber 116 to ignite the fuel/air mixture creating a self-sustaining flame. The fuel injector 132 should be spaced a distance from the inlet zone 138, shown in FIG. 11A of the drawings. FIG. 11A of the drawings shows the inlet zone 138 with an angled entry end and the fuel injector 132 positioned perpendicular to the outer housing wall 108. Other arrangements can be used, for example, as shown in phantom in FIG. 11A of the drawings, as primary premix conduits 134' and fuel injectors 132'.

Figure 12:
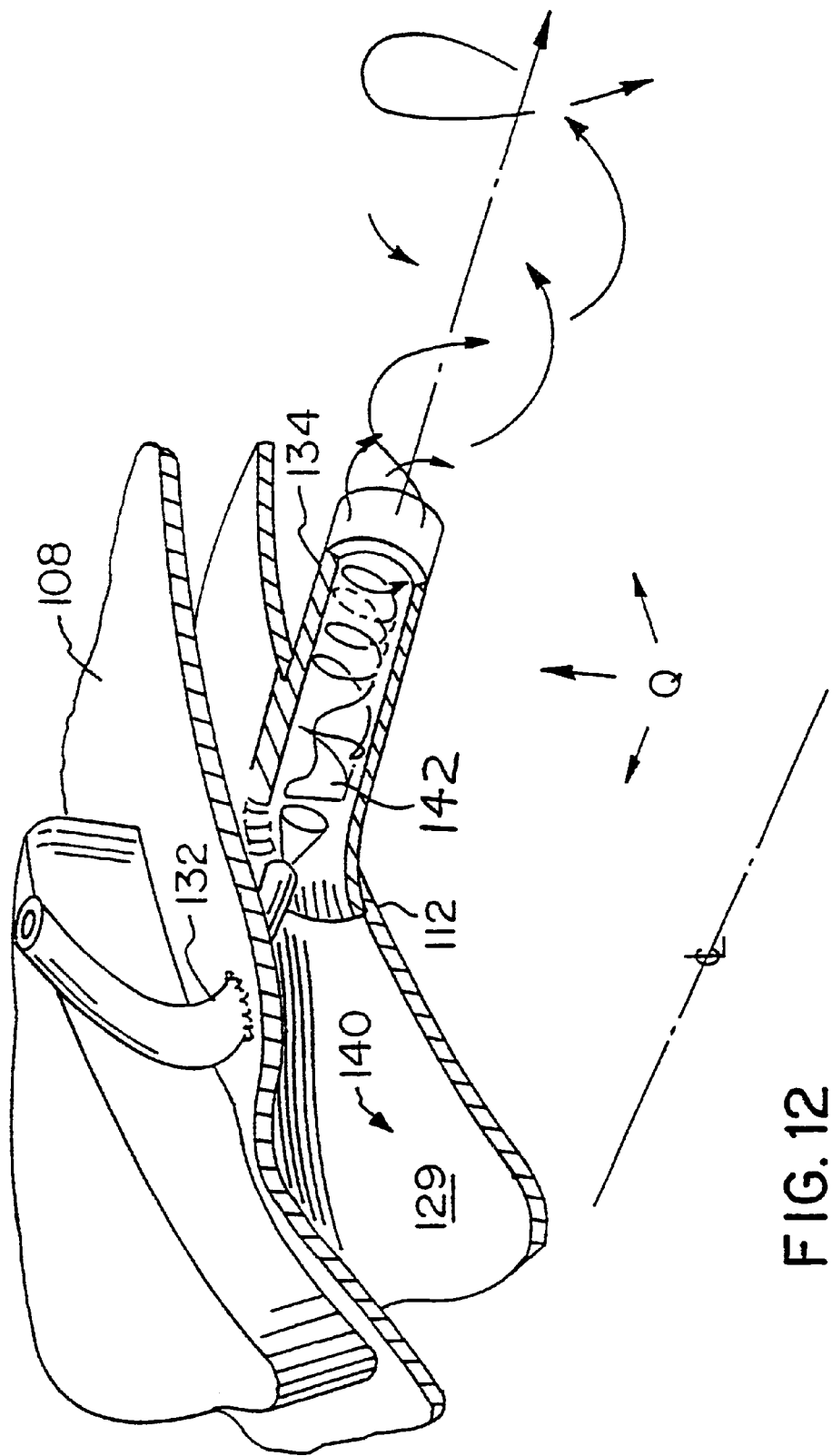
FIG. 12 is a top perspective view, partially in section, of a portion of another embodiment of a combustor similar to the combustor shown in FIG. 10.

The operation of the combustor is described hereinafter with reference to FIGS. 10, 11A and 11B of the drawings. The engine rotor 106 is rotated causing compressor blades 102 to rotate about the Z axis. Air is drawn into the intake 110 becoming compressed and flowing in the air path 118 and the air flow path 129 in the direction of arrows 140. The directed compressed air exits into the annular combustion chamber 116 through the cooling duct 119 and the air dilution nozzle 122 and holes H. Compressed air also enters the inlet ends 138 of the primary premix conduits 134. Air also enters secondary air supply holes 143 which are in fluid communication with an entry end E of respective premix chambers 130. Pressurized fuel exits the ends of the fuel injectors 132 and is carried by the compressed air (because of generated differential pressure across the combustor liner) into the inlet ends 138 of the primary premix conduits 134 simultaneously forming a rich fuel/air mixture. This fuel/air mixture passes through the optional swirlers 142 to enhance hot wall fuel vaporization causing it to swirl once a flame is initiated. Also, longer primary premix conduits 134 can be provided for a higher residence time of a rich fuel/air mixture; however, the present arrangement will suffice and provide good vaporization and homogenous fuel/air mixing. FIG. 12 of the drawings shows another embodiment having swirlers 142 with the nozzle 132 positioned within the primary premix conduit 134. Referring back to FIGS. 10 and 11A of the drawings, this rich fuel/air mixture flows from the primary premix conduits 134 to the premix chambers 130 where further air mixes to yield a lean fuel/air mixture for combustion and exits the exit ends into the annular combustion chamber 116 in a predominantly circumferential direction into the flame front. Initially, the igniter GP ignites the mixture which burns to produce energy for power. After ignition, the igniter GP remains shut off. Downstream and prior to the air dilution nozzle 122 dilution air enters the flame to reduce the temperature of the products of combustion. The exiting gases then pass the generated flame front after the dilution air is mixed and goes into and through the turbine nozzle to generate a velocity for related turbine wheel power extraction through the turbine blades 104, which drives the compressor blades 102 and the alternator, shown in FIGS. 18 and 19 of the drawings.

Figure 13A:
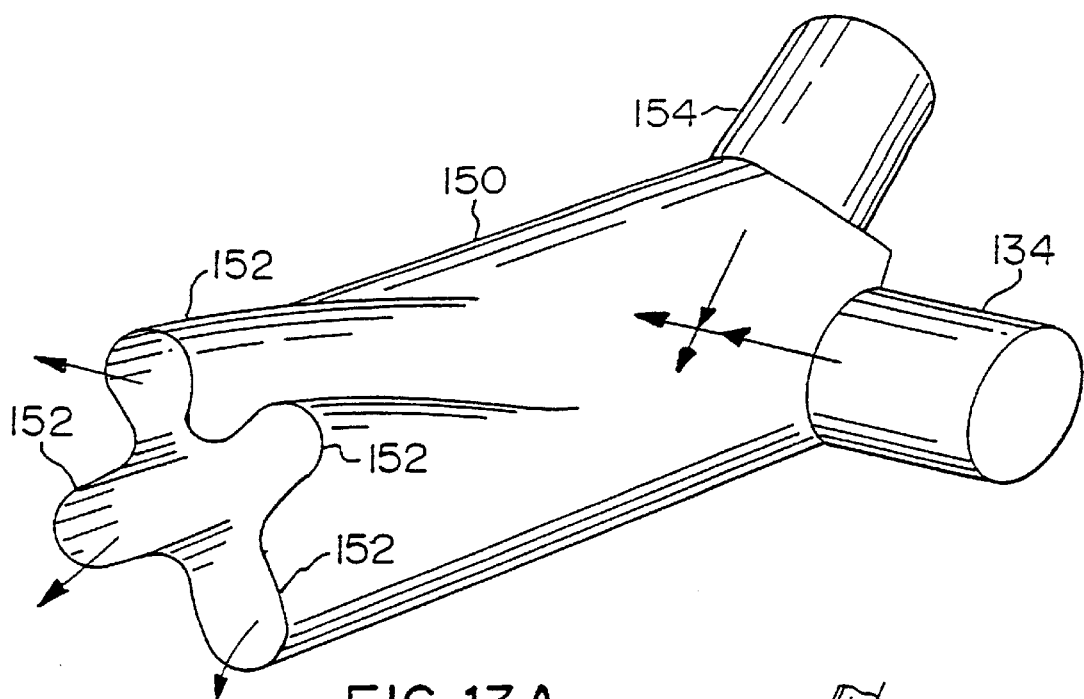
FIGS. 13A, 13B, 13C and 13D are perspective views of alternate designs of a primary/secondary premixing chamber of the combustor shown in FIG. 10.
Figure 13B:
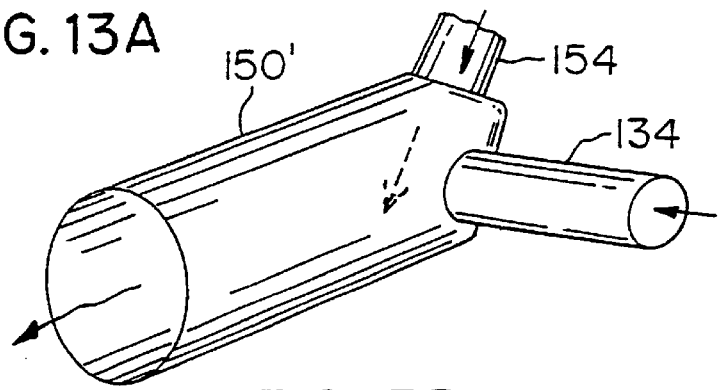
Figure 13C:
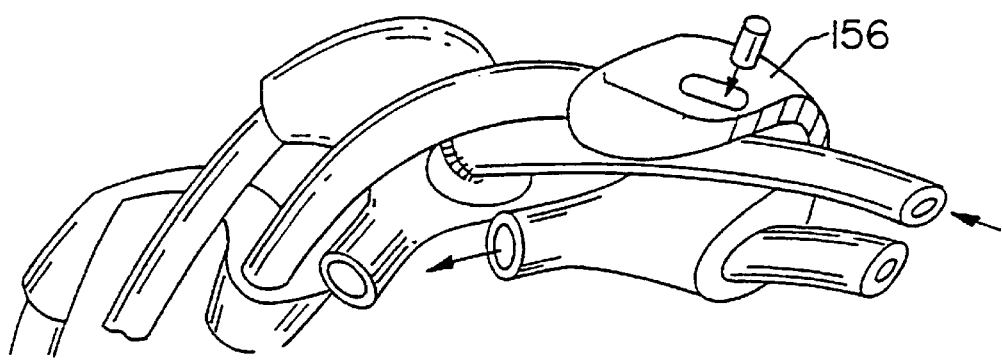
Figure 13D:
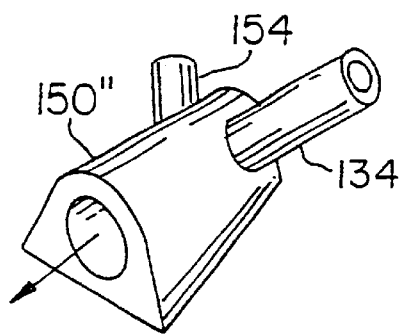

FIGS. 13A, 13B, 13C and 13D of the drawings show alternate arrangements of the previously described premix chambers 130. Specifically, with respect to FIG. 13A of the drawings, each primary premix conduit 134 is fed into a twisted lobed fuel secondary premix chamber 150 to enhance the secondary premixing prior to combustion. Each lobe 152 has a twisted shape to cause the fuel/air mixture to swirl. A secondary air conduit 154 is provided and has a discharge end connected to a respective secondary premix chamber 150 intermediate the ends of the secondary premix chamber 150 which is in fluid communication with the air flow path 129. Entry ends of the secondary air conduits 154, which are secured to the outer combustor wall 112, are positioned within the air flow path 129. The arrangement shown in FIG. 13B of the drawings is similar to the arrangement shown in FIG. 13A of the drawings with like reference numerals being used for like parts. Specifically, primary premix conduit 134 and secondary air conduit 154 feed into a cylindrical secondary premix chamber 150 as opposed to a twisted lobed arrangement. As shown in FIG. 13C of the drawings, a mixing block 156 is located at the junction of each primary premix conduit 134, the secondary air conduit 154 and the secondary premix chamber 150 to mix the effluents from conduits 134 and 154. The mixing blocks 156 offer a large mass and are attached to the combustor liner and correspondingly yields reduced liner heating and typical distortion tendencies. FIG. 13D of the drawings is similar to the arrangement shown in FIG. 13B of the drawings with like reference numerals being used for like parts. Specifically, the primary premix conduit 134 and the secondary air conduit 154 feed into a diverging secondary premix chamber 150".

Figure 13E:
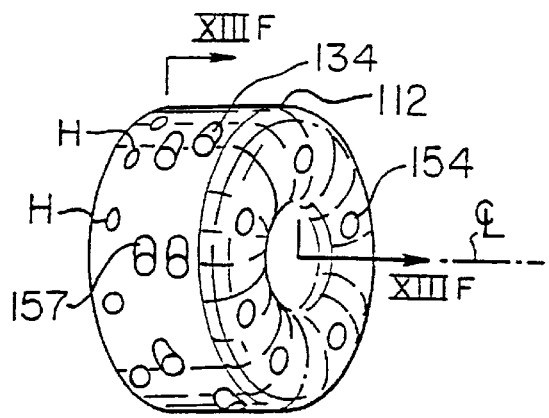
FIG. 13E is another embodiment of a top perspective view of an outer combustor liner wall.
Figure 13F:
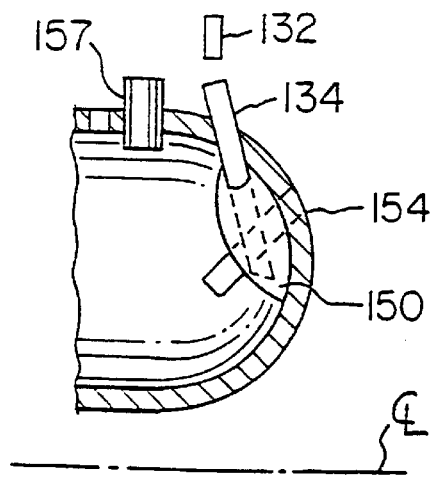
FIG. 13F is a partial section taken along lines XIIIF—XIIIF of FIG. 13E.

FIGS. 13E and 13F of the drawings show another embodiment of an outer combustor liner wall 112 having a plurality of circumferentially spaced holes H, a primary premix conduit 134, a secondary premix chamber 150", a secondary air conduit, as previously discussed, and a supplemental secondary air supply conduit 157 adapted to have compressed air from the air flow path 129 to flow therethrough and exit into the annular combustion chamber 116 in a circumferential direction about the outer combustor liner wall 112. This arrangement aids in breaking up any flame front pressure pulses.

In operation, the present invention results in a low $NO_x$ formation and overall emission species are reduced.

Low $NO_x$ ($NO+NO_2$) under 10 parts per million (ppm) is desirable in combustors and can be achieved through a low oxidizing environment (fuel/air contained within the primary premix chamber for a long residence time) with low flame temperatures and after the secondary lean fuel/air mixture with a low residence time combusts resulting in a low $NO_x$ flame temperature. A long residence time in the primary premix to liberate the nitrogen atom with minimal oxygen available is preferred (rich fuel/air mixture, long residence primary premix) to liberate hydrogen molecules to enhance flame stability. Too low of an oxidizing primary flame zone temperature will cause excess UHC (unburned hydrocarbons) with CO (carbon monoxide). Hence, a nonflame primary premix is preferable. A low temperature range flame is attained through a homogenous, lean prevaporized, premixed staged operation. The low flame temperature can be achieved through a fuel rich or a fuel lean condition, the latter of which is not good due to an increase in CO and UHC.

Figure 14:
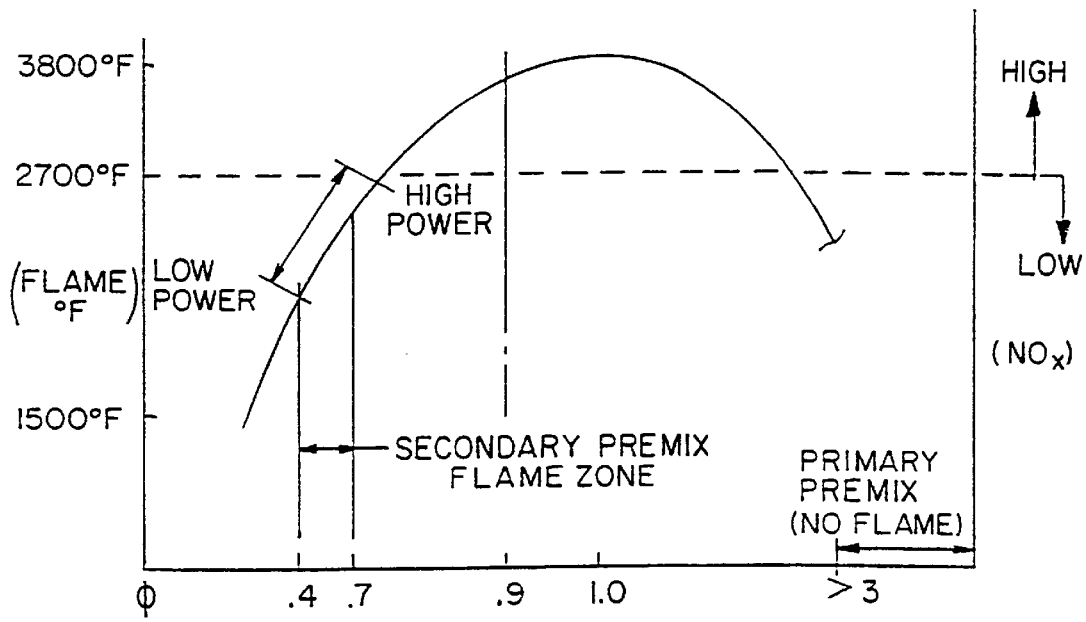
FIG. 14 is a graph of flame temperature verses fuel and air mixtures.
Figure 15:
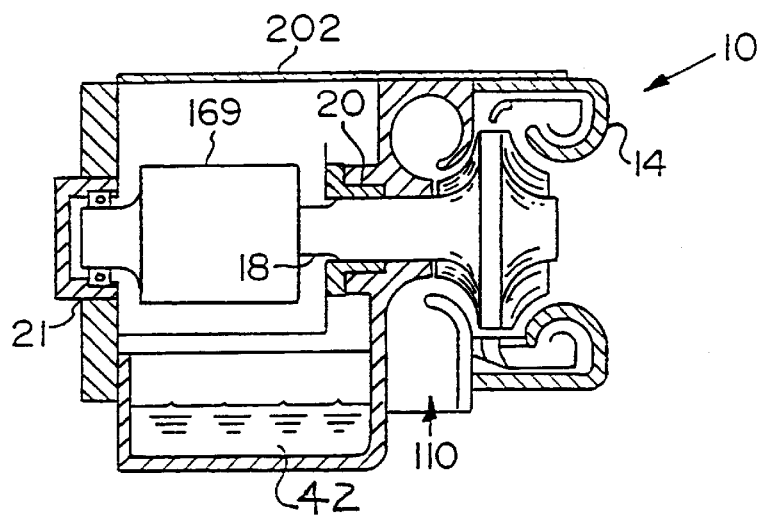
FIG. 15 is a partial longitudinal section of a portion of the turbine in accordance with the present invention.
Figure 16A:
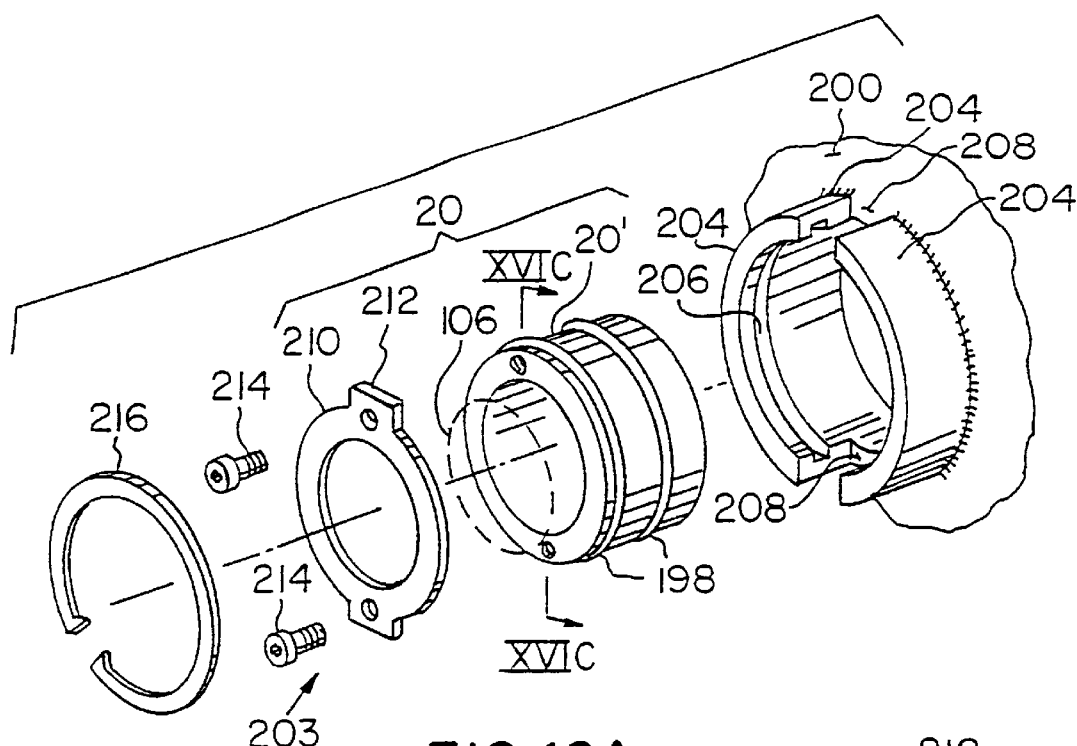
FIG. 16A shows an exploded view of a bearing retention system used in the turbine of the present invention.
Figure 16C:
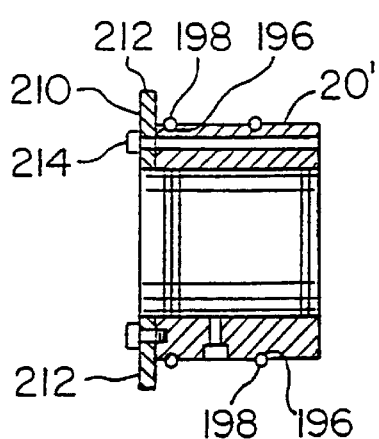
FIG. 16C is a section taken along lines XVIC—XVIC of FIG. 16A.
Figure 16B:
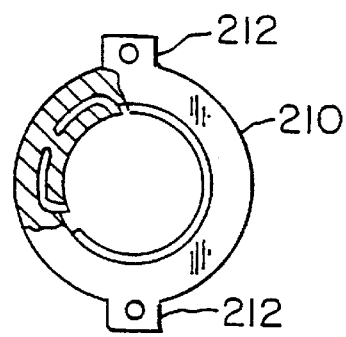
FIG. 16B is a front plan view of a portion of the bearing retention ring and the bearing shown in FIG. 16A.
Figure 16D:
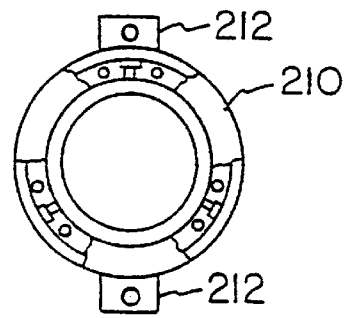
FIG. 16D is another front plan view of a portion of the bearing retention ring and the bearing shown in FIG. 16B.

Preferably, a rich fuel/air premix prevaporized primary mixing system without a flame is followed by a secondary mixing system to attain lean fuel/air ratios, such as prior to combustion to yield a low flame temperature less than 2500° F. and reduced emissions. The rich fuel/air ratio (noncombusted) mixture passes through a long residence time secondary premix leaning stage prior to combustion thus avoiding the stoichiometric flame state and related high $NO_x$. Circumferential mixing and burning combined with a primary rich vaporizing premix followed by a secondary premix chamber, lean fuel/air prior to combustion provides a low emissions combustion. Low flame temperatures yield low $NO_x$ as shown in FIG. 14 of the drawings. Liberated hydrogen in the rich fuel/air primary premix stage combined with relatively low changes in pressure or pressure drop (AP) across the combustor enhances lean flame stability of which the lean secondary chamber short residence leads to.

Initially, in operation, the engine rotor is driven by the battery power, while fuel is simultaneously supplied to the combustion chamber and the igniter is activated. Air flow exits the compressor diffuser in a progressive tangential direction and moves in the direction of the primary injection mixing tubes, wherein an amount of air together with low pressure liquid fuel is injected into the entrance of the mixing tubes or primary premix conduits 134. A simple cavity swirler accepts fuel in two areas to assist in a homogenous mixing from a single jet fuel supply. The fuel is caused to flow into the mixing chambers by a change in pressure across the combustor liner. The fuel (if swirlers are incorporated) is centrifugally spun at the inner diameter wall of the primary mixing tubes where it is vaporized once a flame has been initiated. Then, the rich vaporized fuel/air mixture exits into the secondary premix zone where fuel/air mixture is leaned prior to exiting to the igniter and/or flame zone in the path of the fuel/air mixture and ignites the mixtures. Once a flame has been initiated outside the tube, the heat creates vaporization of the fuel/air mixture within the tubes.

This rich fuel/air mixture in the primary zone which, in turn, is leaned in the secondary chamber, varies in concentration and flame temperature depending upon engine operational speed, but is in the range of 2700° F. to 1500° F. where $NO_x$ is minimized.

The combustion after the secondary premix zone has an elevated lean flame temperature with a low equivalence ratio yielding low emission via low temperature and added oxygen reaction for a chemical reaction change of ($CO+OH=CO_2+H$) reducing the CO emission preferably between 0.6 to 0.9 Ø (equivalence ratio) for a lower flame temperature to keep a low $NO_x$ value.

The combustion products pass through the combustor circumferentially/tangentially keeping the kinetic energy direction typical to that flowing out of the fuel injectors. The flame enters the dilution zone where further compressor discharge air mixes with the combustor products to reduce the flame temperature to a designated turbine inlet temperature. The fuel/air ratio is dependent on the power requirement and air flow, the latter of which may be constant. Fuel flow varies depending on the applied load to the turbine rotor. In operation, the engine rotor speed can be variable or constant.

FIG. 14 of the drawings shows some operating ranges dependent on fuel/air ratios prior to combustion, wherein the stoichiometric temperature of 3800° F. flame temperature would yield excessive $NO_x$. Preferably, the operating temperature is between 1500° F. to 2700° F., and more preferably, below 2600° F., where the lower level of 0.4 to 0.6 Ø would be most preferable. Without variable geometry, Ø will vary dependent upon power requirement. It is believed that 50% of the energy produced through combustion is used to drive the compressor and 50% of the energy is used to generate electricity. Exhaust gas temperature thermocouple 64 measures the temperature of exiting gases. Based upon this information, it is believed that the combustion temperature can be determined based upon the fuel flow rate. Preferably, $NO_x$ production should be limited to below 20 ppm.

Figure 17:
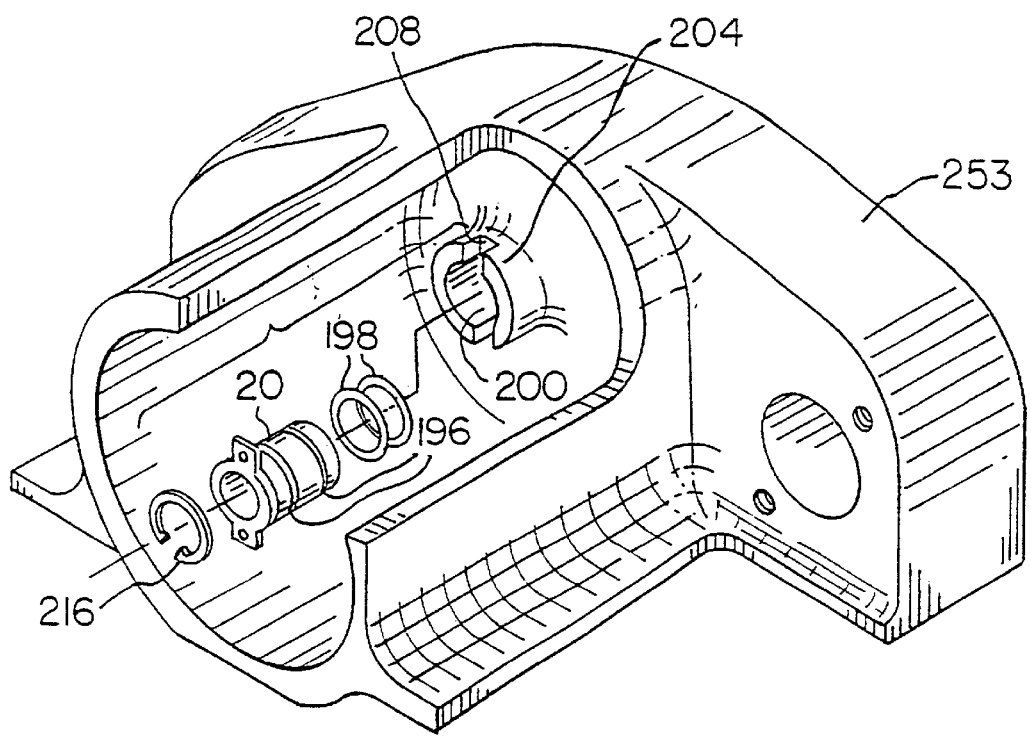
FIG. 17 is an exploded perspective view of a portion of the turbine containing the bearing retention system shown in FIG. 16A.

Another important feature of the present invention is the bearings which support the turbine rotor at speeds in excess of 100,000 RPM. FIGS. 15, 16A–16D and 17 of the drawings show a bearing 20, which is a hydrodynamic and oil damping bearing, that rotatably and slidably receives the turbine rotor 16, shown in FIG. 18 of the drawings. FIG. 17 of the drawings shows a portion of the compressor/turbine arrangement 100 that includes an engine main case 253, a lubrication seal 261, O-rings 198 and a snap ring or locking member 216.

With specific reference to FIGS. 16A–16D of the drawings, the bearing 20, which is shown in FIG. 17 of the drawings, includes an annular-shaped one-piece pad or tilting pad bearing member 20' having two recesses 196 that receive O-rings 198 made of elastomeric material. The bearing member 20' rotatably receives a cylindrical portion of the rotor 18 through an annulus defined by the bearing member 20'. Axial extending screw holes are located on one end surface of the bearing member 20'. Bearing member 20' is received in a cylindrical hole defined in a bearing housing 200 located in the turbine engine housing 202 which is secured to the body of the power plant. The bearing member 20' is secured to the housing by a locking arrangement 203 that is described below. Two spaced apart arcuate lips 204 extend axially from one end of the bearing housing 200. Arcuate-shaped grooves or snap ring recesses 206 (of which only one is shown) are defined on the inner circumferential surfaces of the lips 204. Spaced lug receiving recesses 208 are defined by the ends of lips 204 and terminate at termination points defined along an outer surface of the bearing housing 200. An annular retention lugged ring 210 is provided adjacent to the end of the bearing member 20' having the screw holes. Two lugs 212, spaced 180° apart, extend radially from the retention ring 210 away from the annulus of the bearing member 20' and screw receiving holes are located in the retention ring 210 to secure the retention ring 210 to the end of the bearing member 20' by screws 214 which pass through the holes in the retention ring 210 into the holes in the end of the bearing member 20'. Bearing member 20' is then received in the bearing housing 200 with the lugs 212 positioned within the lug receiving recesses 208 which prevent the bearing member 20' from rotating about a longitudinal axis relative to the bearing housing 200. The snap ring 216 is inserted in the arcuate-shaped grooves 206 in the bearing housing 200 to hold the lugs 212 and, in turn, the retention ring 210 between the snap ring 216 and the bearing housing 200. Preferably, there is a small clearance between the bearing housing 200 and the outer diameter of the bearing member 20'. The O-rings 198 are sandwiched between an outer surface of the bearing member 20' and an inner surface of the bearing housing 200 and act as a damper and a seal. This arrangement provides a full non-interrupted bearing float without the problem of screws coming loose since the snap ring 216 holds the bearing in place. The snap ring 216 also allows for controlled or limited axial and circumferential movement of the bearing member 20' while the snap ring 216 and the termination points restrain the bearing member 20' in the axial direction in the bearing housing 200 and relative to the bearing housing 200 by coacting with the retention ring 210 and the lugs 212.

FIGS. 18 and 19 of the drawings show side elevations of two power plant designs 12' and 12" utilizing many of the previously described elements. Specifically, each of the power plants 12' and 12" includes the annular combustor 14, the exit port 26 and the air inlet port 28. Each of the annular combustors is fluidly coupled to a respective turbine rotor 16 that includes a rotor 18 rotatably supported by bearings 20 and 21.

Referring to FIG. 18 of the drawings, a power plant is shown that includes a body 159 that contains the annular combustor, a rotor, a turbine made of a plurality of blades secured to the rotor and in fluid communication with the combustor, a compressor chamber fluidly coupled to the combustor having a plurality of compressor blades secured to the rotor positioned therein, an air inlet port fluidly coupled to the compressor chamber, an exit port fluidly coupled to the turbine, a plurality of magnets secured to the rotor and a stator made of magnetically attracted material provided in the body and having a stator winding which is positioned in close proximity to the plurality of magnets whereby rotation of the rotor causes a change in flux about the stator to generate electricity by inducing an electric current in the stator winding. Inlet air flows from the air inlet port 28 toward the compressor blades 102 along a flow path 160. The flow path 160 is defined between an outer shroud 162 and the sump 42 as depicted in FIGS. 1A and 3 of the drawings. In the embodiment shown in FIG. 18 of the drawings, ambient temperature air is drawn into the air inlet port 28 and around the sump 42 along flow path 160. The ambient temperature air is slightly heated by the elevated oil temperature which, in turn, cools the oil contained in the sump 42. The air is then compressed by the compressor blades 102. The compressed air then travels into the annular combustor 14 as previously discussed and the products of combustion and the gases exit through exit port 26. A seal plate assembly 400, discussed hereinafter, is positioned between the compressor blades 102 and the turbine blades 104 and acts as a heat shield. A cylindrical sleeve 169 is provided, which is made of a high temperature resistant polymer resin having carbon fibers. The cylindrical sleeve 169 is placed around the magnets and retains the magnets. The magnets and the cylindrical sleeve 169 are secured to the rotor and forms the alternator rotor which is mechanically attached to the engine rotor 500. The carbon fibers in the sleeve 169 permit the sleeve 169 to sustain forces generated by high rotational speeds.

Referring to FIG. 19 of the drawings, which is similar to FIG. 18 of the drawings, wherein like reference numerals represent like elements, there is shown a heat exchanger 170. The heat exchanger 170 includes an outer shroud 172, an inlet stream passageway 174 and an exit stream passageway 176. The inlet stream passageway 174 is positioned adjacent the exit stream passageway 176 and share a common wall after inlet air passes through the compressor blades 102 in the compressor. The inlet air then flows through a plurality of flow tubes 178 that pass through the exit stream passageway 176 and into the annular combustion chamber 116. Exiting gases from the annular combustion chamber 116 flow into the turbine area where the exiting gases flow past the turbine blades 104 into the heat exchanger 170, which includes a flow exit area 180 around the flow tubes 178 heating the inlet air. The exiting gases then flow into the exit stream passageway 176, which is adjacent to and in close proximity to the inlet stream passageway 174 so that heat from the exhaust gases passing through the exit stream passageway 176 can flow to the compressed air passing through the inlet stream passageway 174 thereby cooling the exiting gases and heating the inlet air. The exiting gas then exits through the exit port 26. The hot exit gases preheat the inlet gases and increase the efficiency of the power plant 12".

Figure 20:
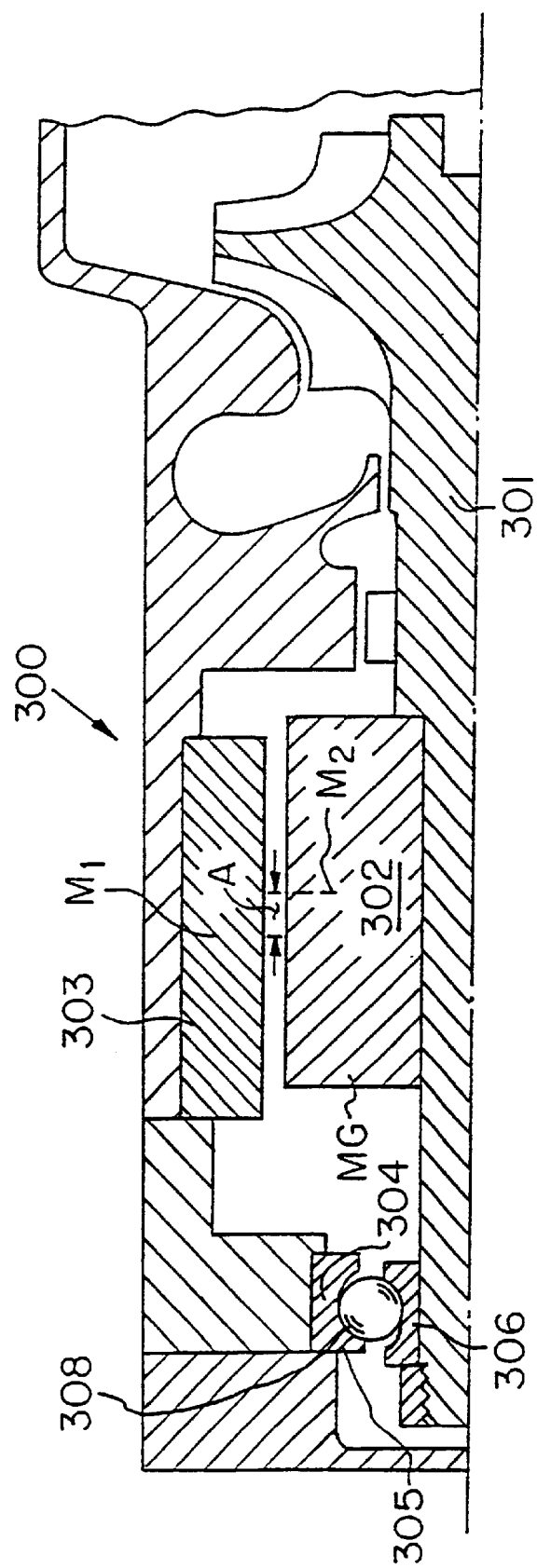
FIG. 20 is a side elevation, partially in section, of a portion of a magnetic preload ball bearing system made in accordance with the present invention.

A magnetic preload system is provided, shown in FIG. 20 of the drawings. Typical oil lubricated ball bearing systems require a light "preload" to assure the balls are in contact with respective inner and outer races to prevent relative skidding and inherent material spalling damage during rotor spin up. Gas turbine engines usually develop a safe bearing thrust load through engine operation pressures at approximately 30% design rotor speed, but until then the balls are subject to some levels of skidding which could lead to "spall" damage. Some small gas turbines have a set of ball bearing springs preloaded to each other like machine spindles, but the gas turbine may be compromised by inherent poor rotor designs yielding other problems.

The present embodiment includes an integral alternator provided with an engine rotor system 300 which includes a rotor 302 and a stator 303 having their respective centers of mass which are approximately 2% axially offset from each other, thereby creating an inherent axially forward magnetic attraction of the rotor 302 to the stator 303 which includes iron. This provides a beneficial preload condition to the ball bearing without causing alternator electrical output impairment and by incorporating only one ball bearing.

Specifically, the rotor 302 includes a plurality of circumferentially positioned permanent magnets MG (of which only one is shown) which are positioned adjacent to and in close proximity to the stator 303. The magnets MG of rotor 302 and the stator 303 have centers of masses $M_1$ and $M_2$ which are offset by a distance "A". The rotor 302 is attached to an engine rotor 301 (which corresponds to rotor 18 in FIG. 1 of the drawings). A ball bearing 304 (which corresponds to earlier described bearing 21) is provided on an end of the engine rotor 301 defining a bearing receiving portion of the rotor 302. The ball bearing 304 includes an annular inner race 306 secured to the engine rotor 301 and an annular outer race 305 coaxially positioned with the annular inner race 306 and secured to a stator housing 307 of the body. Balls 308 are received within a ball receiving recess defined between the annular inner race 306 and the annular outer race 305. The magnetic attraction of the stator 303 to the rotor 302 in the axial direction as represented by centers of masses $M_1$ and $M_2$ causes a continuous preload to be applied to the ball bearing 304 to help prevent spalling and causes a relative axial offset between the annular outer race 305 and the annular inner race 306.

Figure 21:
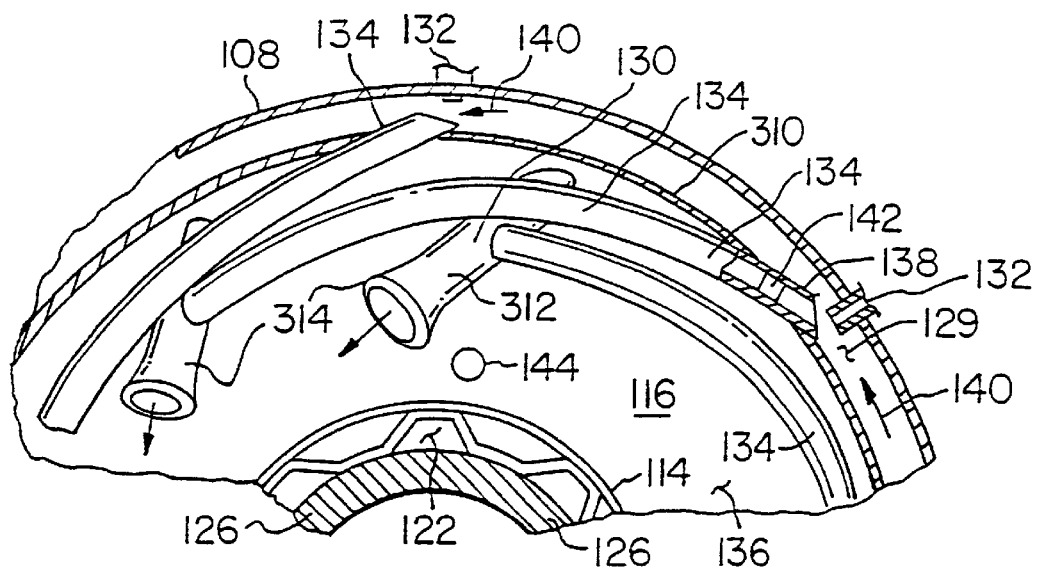
FIG. 21 is an end view of a portion of a liner wall of an alternate embodiment of the present invention.
Figure 22:
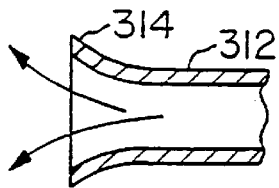
FIG. 22 is a cross-sectional view of a secondary mixing chamber shown in FIG. 21.

FIGS. 21 and 22 of the drawings show another embodiment of the present invention. Specifically, FIG. 21 of the drawings shows a portion of a liner wall 310 similar to a rearward portion of the outer combustor liner wall 112, shown in FIG. 11A of the drawings. Like reference numerals designate like elements. The portion of the liner wall 310 includes a rear wall having a plurality of circumferentially spaced premix chambers 312 similar to the arrangement, shown in FIG. 11A of the drawings, except exit areas or ends 314 of the premix chambers 312 diverge, as opposed to being straight, shown in FIG. 11A of the drawings. FIG. 22 of the drawings shows the premix chamber 312 in more detail. The diverging exit area 314 decreases the gas exit velocity of the fuel/air mixture into the annular combustion chamber 116. The fuel/air mixture exits into the annular combustion chamber in a circumferential diverging direction. The diverging arrangement of the premix chamber 312 acts as a flame holder to enhance flame stability.

Figure 23:
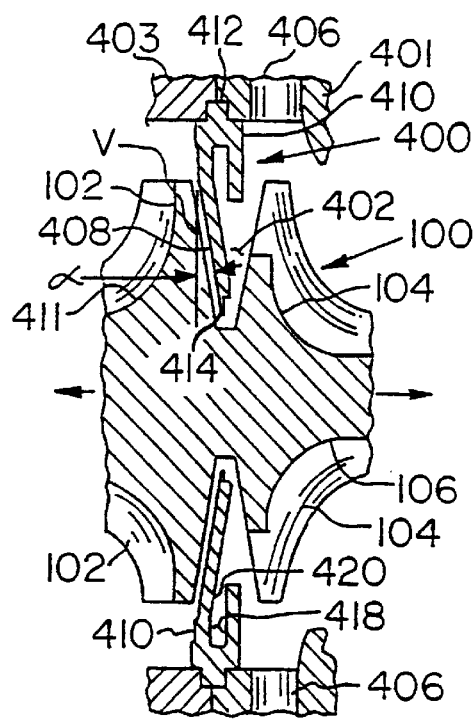
FIG. 23 is a sectional view of a portion of a compressor/turbine arrangement including compressor blades and turbine blades positioned around a rotary drive shaft and a split ring arrangement.

FIG. 23 of the drawings shows a portion of the compressor/turbine arrangement 100 in more detail. The compressor/turbine arrangement 100 is an integral arrangement that includes the plurality of compressor blades 102 spaced apart from the plurality of turbine blades 104. The compressor blades 102 and turbine blades 104 are secured to the rotary drive shaft 106 via a turbine disk and a compressor disk; the compressor blades 102 are subjected to cooler gases than the turbine blades 104; and the compressor blades 102 could fail if subjected to the hot gases that come in contact with the turbine blades 104. Therefore, a seal plate assembly 400 is retained between a turbine nozzle 401 and a diffuser 403 in a recessed portion or ring receiving space 402 which is defined between the plurality of compressor blades 102, the plurality of turbine blades 104 and the rotary drive shaft 106.

Figure 24:
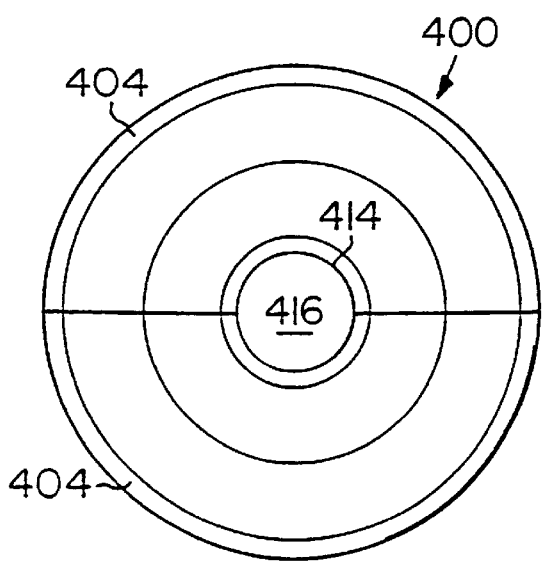
FIG. 24 is a front elevation of the split ring arrangement shown in FIG. 23.

As shown in FIG. 24 of the drawings, the seal plate assembly 400 is a split ring which is substantially circular in shape and is made up of two semi-circular sections 404. Preferably, each of the two semi-circular sections 404 is made of heat resistant material. The semi-circular sections 404 of seal plate assembly 400 are held in place by a cavity fit between the diffuser 403 and the turbine nozzle 401 secured to the body, shown in FIGS. 19 and 23 of the drawings. Referring to FIG. 23 of the drawings, a cross section of each semi-circular section 404 includes a slanted portion 408, a cup portion 410 connected to the slanted portion 408 and a lip portion 412 connected to the cup portion 410. The turbine nozzle 401 abuts against a seal lip portion 412 to hold the seal plate assembly 400 in place. The seal plate assembly 400 defines a hole 416 having an outer diameter approximately equal to but greater than a diameter of the rotary drive shaft 106 positioned adjacent the ring receiving space 402 which passes through hole 416. Slanted portions of the seal plate assembly 400 is in close proximity of a compressor wheel 411 which is defined by the compressor blades 102. Edges of the plurality of compressor blades 102 extend along an angle a and are positioned adjacent to the slanted portion 408, shown in FIG. 19 of the drawings. An air or gas gap 418 is defined by a surface 420 of the slanted portion 408 and the cup portion 410. More specifically, surface 420 and the cup portion 410 include two spaced apart walls that are in fluid communication with the annular combustion chamber 116 which define the gas gap 418. The seal plate assembly 400 separates the compressor blades 102 from the turbine blades 104 so as to prevent gas from flowing directly to the turbine blades to the compressor blades and vice versa. The combination of poor thermal conductivity properties of HASTALLOY-X® material, the gas gap 418 and small contact area of the lip portion 412, which has an opening defined adjacent the plurality of turbine blades 104, provides excellent insulation to the plurality of compressor blades 102. It is believed that the seal plate assembly 400 can be made of ceramic material or other poor thermal insulating materials and high oxidation resistant materials in lieu of HASTALLOY-X® material.

Generally, the method for operating the above-described electricity generating system is as follows. First, the rotor is rotated by providing electricity, i.e., current from a battery, to the stator. This causes air to be drawn into the compressor which becomes compressed air. The compressed air flows into the combustion chamber, at least a portion of which mixes with fuel resulting in a fuel/air mixture. The fuel/air mixture is ignited in the combustion chamber resulting in exhaust gases. The exhaust gases and any remainder of the compressed gas pass through the turbine nozzle of the turbine, which then exits. The electricity provided to the stator is stopped when the rotor rotates at a first speed causing electricity to be generated by the rotating magnets positioned about the rotor coacting with the stator. Preferably, the rotor bearings are lubricated by lubricating oil and the lubricating oil and fuel are provided through pumps driven by one motor. Preferably, the fuel/air mixture is introduced into the combustion chamber through diverging nozzles and the compressed air is preheated by exhaust gases.

Referring again to FIGS. 1A and 1B of the drawings, the electricity generating system 10 operates in the following preferred manner. First, the electricity generating system 10 is started by drawing energy from the DC battery 72 and an electromechanical fuel valve is opened, which is referred to as the starter operation. Alternatively, an AC power can be used in lieu of the DC battery 72. This valve is always open and is only closed in emergency situations, wherein the fuel must be cut off. The igniter is then energized. Power from the DC battery 72 is pulsed to the igniter. The battery power causes the compressor shaft to rotate so that the inlet air flows to the annular combustor 14. The fuel purge valve 39 is maintained in a closed position and is only opened upon shutdown for a period of time to purge fuel from fuel injectors 40 to the supply tank 30 by the combustor back pressure.

The electric motor 52 is then energized. This motor drives the lubricating oil pump 50 and fuel pump 36. The gas turbine engine alternator/motor will not be energized until oil pressure reaches a set minimum. The oil pressure transducer monitors oil pressure to determine emergency shutdown conditions where oil pressure drops below a set level. The fuel pump 36 simultaneously provides a regulated fuel supply pressure.

With the above-noted sequences, the engine stator begins engine rotation causing air to flow into the engine. At approximately 5% of the design rotor speed, ignition continues and when the engine rotor is at approximately 10% of the design rotor speed, fuel is delivered to the combustor. The igniter GP ignites the fuel/air mixture in the annular combustor 14. At approximately 40% of the design rotor speed, the igniter and the starter operation are turned off. The engine continues to accelerate to the design rotor speed. It is important that the ignition of this mixture occurs early to permit a gentle fuel/air flame ignition. Initial amounts of fuel flowing to the combustor are established based upon the inlet and exit exhaust gas temperatures which are used to set the proportional solenoid fuel metering valve 38. Following the initial ignition and sufficient flame energy, the rotor speed accelerates to the design rotor speed. The speed of the rotor is dependent on the exhaust gas temperature. The electric motor 52 is shut off if the exhaust temperature exceeds a predetermined maximum temperature for more than four seconds.

It is believed that the present system replaces the present state-of-the-art diesel electric generators which weigh on the order of 2,000 pounds. It is also believed that a 45 kilowatt generator powered by a gas turbine made in accordance with the present invention will weigh approximately 350 pounds and emit less than 30 ppm $NO_x$. Further, the present invention can operate efficiently at variable speeds, but preferably at a constant speed.

More specifically, during power/initialization of the system, energy is drawn from a 24 volt battery. An electromechanical fuel valve is open. An igniter is then energized by providing pulse-power to a spark plug (0.25 to 0.34 volts of electricity energy at 2500 volts, four to five sparks per second). This depends on whether the system is to be "cold started" or "hot started" where a "cold start" occurs when the compressor has not been operated for a lengthy period of time and a "hot start" occurs when the compressor was recently operated. The compressor inlet temperature or a residual exhaust temperature will affect the initial fuel flow to avert an over temperature condition. Fuel flow is controlled through a proportional solenoid valve setting. The previously disclosed springloaded purge valve is normally closed and is only energized open upon the shutdown for a time period of one minute to purge residual fuel via combustor back pressure into the fuel tank. The oil pump is energized along with the fuel pump by the electric motor to the gerotor oil pump and fuel pump. The gas turbine engine electric motor will not be energized to spool up until the oil pressure is at a minimum pressure level. An oil pressure transducer is also used for emergency shutdown if the oil pressure drops below a minimum value. An automotive type fuel pump driven by a 24 volt motor provides a regulated fuel supply pressure of 65 to 70 psig to the proportional solenoid metering valve which is set to a scheduled value. Preferably, the oil pump and the fuel pump are driven by the same motors. The gas turbine rotor is then rotated through an electric motor where the generator acts as a start motor. The amount of energy needed to spool up the motor is predicated on: 1) the flow and pressure through the compressor; and 2) the energy extracted from hot gases that expand through the turbine, which increases as a function of design rotor speed between 20% to 50–60% of speed and/or temperature. At approximately 40% of the design rotor speed, the electric motor energy will be cut off and the rotor will be self-sustaining. Fuel flow to the combustor is initiated at 5% of the 100% design rotor speed (for example, 5,000 RPM on a 100,000 RPM system). It is important that ignition occurs early (the light-off period). This allows for a gentle ignition. An initial amount of fuel that flows to the combustor is established based upon inlet and residual exhaust gas temperatures to properly set the proportional solenoid valve. Fuel is increased to the combustor until the rotor rotates at 100% of its design rotor speed. Following the initial light-off, the control system monitors the exhaust gas temperature above 1000° F. and controls the acceleration rate of the rotor speed to approximately 90% of the design rotor speed. At this point, control of the fuel occurs so that the exhaust temperature is within a range of 500° F. to 1000° F., and more preferably, between 500° F. to 700° F. Start time to 100% design rotor speed could be less than ten seconds. An over temperature shutoff switch is positioned near the exhaust port so as to shut off the fuel supply if the exhaust temperature exceeds a preset value for a number of seconds. At a 90% design rotor speed of the unit rotor speed, the system will be controlled through a closed route loop to maintain a 100% design rotor speed. Thus, fuel flow will vary on the load demand to maintain a 100% design rotor speed. Preferably, the speed control loop at 100% design rotor speed is maintained by shutting the ignition off and pulling the power from the system. The exhaust gas temperature will vary with power demands.

The present invention has the ability to maintain a 100% design rotor speed during an on-load and off-load condition and is believed that approximately 50% of the total turbine power is required to drive the compressor in a no-load condition. Further, the engine controller monitors the system to determine whether there has been a failure of the fuel pump, the oil pump or the electric motor 52 driving these pumps.

Having described the presently preferred embodiments of the invention, it is to be understood that they may otherwise be embodied within the scope of the appended claims.

We claim:

1. An electricity generating system, comprising:
    a body;
    a combustor provided in said body;
    a turbine made of a plurality of turbine blades secured to a rotor, provided in said body and in fluid communication with said combustor;
    a compressor chamber provided in said body and in fluid communication with said combustor;
    a plurality of compressor blades secured to said rotor, said compressor blades positioned within a compressor chamber;
    an air inlet port in fluid communication with said compressor chamber;
    an exit port in fluid communication with said turbine;
    a plurality of magnets secured to said rotor; and
    a stator made of a magnetically attracted material provided in said body, said stator positioned in close proximity to said plurality of magnets whereby rotation of said rotor causes a change in flux about said stator thereby generating electricity; and
    a fuel metering valve in fluid communication with said combustor, wherein said fuel metering valve comprises a proportional solenoid having a plunger having a tip, said plunger adapted to extend along a longitudinal axis, a valve body defining a plunger cavity, an inlet and an outlet, said plunger extending within said plunger cavity, and a flow plate having a hole defined therein, said flow plate secured to said valve body and positioned within said plunger cavity between said inlet and said outlet whereby movement of said plunger in a first longitudinal direction causes said tip to coact with the hole defined in said flow plate to vary a flow from said inlet to said outlet through said hole defined in said hole plate.

2. An electricity generating system as claimed in claim 1, wherein said tip has a diameter that varies with respect to the longitudinal axis.

3. An electricity generating system as claimed in claim 2, wherein the tip diameter varies between a diameter less than a diameter of the hole defined in said flow plate to a diameter greater than the diameter defined in the flow plate whereby said plunger is adapted to move both in the first longitudinal direction and a second longitudinal direction, and when said plunger moves a first distance in the first longitudinal direction, said plunger tip extends through said hole defined in said flow plate and contacts said flow plate, blocking flow across said flow plate in a blocked position, and when said plunger is moved in the second direction from the blocked position, said tip is positioned away from said flow plate and flow through said flow plate varies as a function of a longitudinal position of said tip.

4. An electricity generating system, comprising:
    a body;
    a combustor provided in said body;
    a turbine made of a plurality of turbine blades secured to a rotor, provided in said body and in fluid communication with said combustor;
    a compressor chamber provided in said body and in fluid communication with said combustor;
    a plurality of compressor blades secured to said rotor, said compressor blades positioned within a compressor chamber;
    an air inlet port in fluid communication with said compressor chamber;
    an exit port in fluid communication with said turbine;
    a plurality of magnets secured to said rotor;
    a stator made of a magnetically attracted material provided in said body, said stator positioned in close proximity to said plurality of magnets whereby rotation of said rotor causes a change in flux about said stator thereby generating electricity; and
    a fuel metering valve fluidly coupled to said combustor, wherein said fuel metering valve comprises a proportional solenoid having a plunger that is adapted to extend along a longitudinal axis, said plunger having a tip, and a valve body defining a plunger cavity, an inlet and an outlet, said plunger extending within said plunger cavity, said tip having a blocking portion and a flow passageway defined therein having an inlet port and an outlet port, wherein said inlet port is in fluid communication with said outlet port whereby movement of said tip in a first longitudinal direction causes said inlet port, outlet port and blocking member to coact with said inlet and outlet to vary a flow through said valve body from said inlet to said outlet.

5. An electricity generating system, comprising:
    a body;
    a combustor provided in said body;
    a turbine made of a plurality of turbine blades secured to a rotor, provided in said body and in fluid communication with said combustor;
    a compressor chamber provided in said body and in fluid communication with said combustor;
    a plurality of compressor blades secured to said rotor, said compressor blades positioned within a compressor chamber;

an air inlet port in fluid communication with said compressor chamber;

an exit port in fluid communication with said turbine;

a plurality of magnets secured to said rotor;

a stator made of a magnetically attracted material provided in said body, said stator positioned in close proximity to said plurality of magnets whereby rotation of said rotor causes a change in flux about said stator thereby generating electricity;

an annular-shaped bearing rotatably receiving a cylindrical portion of said rotor through an annulus defined in said bearing, said bearing secured to said body, said bearing adapted to support said rotor so that said rotor can rotate about a longitudinal axis; and a locking arrangement for securing said bearing to said body, said locking arrangement, comprising a lug secured to said bearing and extending in a radial direction away from the annulus, a cylindrical bearing receiving hole defined in the body to receive said bearing and a lug receiving recess defined in said body for receiving said lug and prevent said bearing from rotating about the longitudinal axis relative to said body, and a locking member coacting with said bearing for limiting movement of said bearing in a first longitudinal direction relative to said body.

6. An electricity generating system as claimed in claim 5, wherein said lug receiving recess terminates at said body at a termination point, the termination point coacts with said lug for limiting movement of said sleeve in a second longitudinal direction relative to said body.

7. An electricity generating system, comprising:

a body;

a combustor provided in said body;

a turbine made of a plurality of turbine blades secured to a rotor, provided in said body and in fluid communication with said combustor;

a compressor chamber provided in said body and in fluid communication with said combustor;

a plurality of compressor blades secured to said rotor, said compressor blades positioned within a compressor chamber;

an air inlet port in fluid communication with said compressor chamber;

an exit port in fluid communication with said turbine;

a plurality of magnets secured to said rotor;

a stator made of a magnetically attracted material provided in said body, said stator positioned in close proximity to said plurality of magnets whereby rotation of said rotor causes a change in flux about said stator thereby generating electricity;

an annular-shaped bearing rotatably receiving a cylindrical portion of said rotor through an annulus defined in said bearing, said bearing secured to said body, said bearing adapted to support said rotor so that said rotor can rotate about a longitudinal axis; and a damper positioned between an outer surface of said bearing and said body.

8. An electricity generating system as claimed in claim 7, wherein said damper is an O-ring made of elastomeric material.

9. An electricity generating system as claimed in claim 6, wherein two lug receiving recesses are defined by a pair of spaced arcuate lips, each of said accurate lips defining an open faced lug receiving recess, wherein the lug receiving recesses are spaced apart and wherein an annular retention lug ring having two radially extending lugs is secured to said bearing, said lugs received by respective lug receiving recesses, and wherein said locking member is a snap ring received within snap ring recesses defined in said arcuate-shaped lips.

10. An electricity generating system, comprising:

a body;

a combustor provided in said body;

a turbine made of a plurality of turbine blades secured to a rotor, provided in said body and in fluid communication with said combustor;

a compressor chamber provided in said body and in fluid communication with said combustor;

a plurality of compressor blades secured to said rotor, said compressor blades positioned within a compressor chamber;

an air inlet port in fluid communication with said compressor chamber;

an exit port in fluid communication with said turbine;

a plurality of magnets secured to said rotor;

a stator made of a magnetically attracted material provided in said body, said stator positioned in close proximity to said plurality of magnets whereby rotation of said rotor causes a change in flux about said stator thereby generating electricity;

a fuel pump in fluid communication with said annular combustor;

a bearing for rotatably supporting said rotor;

a lubricating oil pump in fluid communication with said bearing; and an electric motor coupled to said fuel pump and said lubricating oil pump wherein said fuel pump and said lubricating oil pump are driven by said motor.

11. An electricity generating system as claimed in claim 10, wherein said fuel pump and said oil pump are positive displacement pumps.

12. An electricity generating system as claimed in claim 11, wherein each of said pumps comprises an inner rotor positioned within a casing, said inner rotor adapted to move about said casing to pump fluid through said casing, each of said inner rotors driven by said electric motor.

13. An electricity generating system as claimed in claim 11, wherein each of said positive displacement pumps is of the generator type, wherein each of said inner rotors coacts with an outer rotor positioned between said casing and said inner rotor, and a shaft is coupled to at least one of said inner rotors and said electric motor.

14. An electricity generating system as claimed in claim 10, wherein said combustor is an annular combustor.

15. An electricity system as claimed in claim 1, wherein said combustor is an annular combustor.

16. An electricity system as claimed in claim 4, wherein said combustor is an annular combustor.

17. An electricity system as claimed in claim 5, wherein said combustor is an annular combustor.

18. An electricity system as claimed in claim 7, wherein said combustor is an annular combustor.

* * * * *

UNITED STATES PATENT AND TRADEMARK OFFICE
CERTIFICATE OF CORRECTION

PATENT NO. : 6,314,717 B1
DATED : November 13, 2001
INVENTOR(S) : J. Michael Teets et al.

It is certified that error appears in the above-identified patent and that said Letters Patent is hereby corrected as shown below:

Column 2,
Line 6, after "arrangement" insert period -- . --.
Line 50, "3A" should read -- 1A --.

Column 5,
Line 37, "oil pump So" should read -- oil pump 50 --.
Line 42 "electromechanical" should read -- electro-mechanical --.
Line 58, "FIGS. 3A" should read -- FIGS. 1A --.

Column 7,
Line 55, before "annular" insert -- An --.

Column 8,
Line 2, "$NO_x$emmissions" should read -- $NO_x$ emissions --.

Column 10,
Line 45, "(AP)" should read -- ($\Delta P$) --.

Column 15,
Line 3, "angle a" should read -- angle $\alpha$ --.
Line 46, "electromechanical" should read -- electro-mechanical --.

Column 16,
Line 40, "springloaded" should read -- spring-loaded --.

Signed and Sealed this

Fourth Day of June, 2002

Attest:

JAMES E. ROGAN
Attesting Officer     Director of the United States Patent and Trademark Office